United States Patent
Kono et al.

(10) Patent No.: US 6,169,972 B1
(45) Date of Patent: Jan. 2, 2001

(54) INFORMATION ANALYSIS AND METHOD

(75) Inventors: Yasuyuki Kono; Takehide Yano, both of Hyogo-ken (JP)

(73) Assignee: Kabushiki Kaisha Toshiba, Kawasaki (JP)

(*) Notice: Under 35 U.S.C. 154(b), the term of this patent shall be extended for 0 days.

(21) Appl. No.: 09/258,071

(22) Filed: Feb. 26, 1999

(30) Foreign Application Priority Data

Feb. 27, 1998 (JP) ................................. 10-064432

(51) Int. Cl.[7] .................................................. G10L 15/04
(52) U.S. Cl. .............................. 704/257; 704/251; 704/9; 704/10
(58) Field of Search ................................. 704/251, 253, 704/257, 9, 10, 248

(56) References Cited

U.S. PATENT DOCUMENTS

| | | | |
|---|---|---|---|
| 4,829,423 | * 5/1989 | Tennant et al. | 704/8 |
| 4,864,502 | * 9/1989 | Kucera et al. | 704/8 |
| 5,805,911 | * 9/1998 | Miller | 707/534 |
| 5,828,991 | * 10/1998 | Skiena et al. | 704/9 |
| 5,983,180 | * 11/1999 | Robinson | 704/254 |

FOREIGN PATENT DOCUMENTS 5-197389  8/1993 (JP).
9-134369  5/1997 (JP).

OTHER PUBLICATIONS

M. Tomita, "An Efficient Word Lattice Parsing Algorithm for Continuous Speech Recognition", ICASSP, 86:1569–1572, (1986).

* cited by examiner

Primary Examiner—David R. Hudspeth
Assistant Examiner—Abul K. Azad
(74) Attorney, Agent, or Firm—Finnegan, Henderson, Farabow, Garrett & Dunner, L.L.P.

(57) ABSTRACT

A hash dictionary stores identifiers of word-class sequences by unit of the word-class and appearance number. A node of each word in word-lattice includes the word-class, an inter-processing list, lists of next nodes and unprocessed antecedent nodes. The interprocessing list of the node directly linked from a start node stores the identifiers of word-class sequences for the word-class and the appearance number "1" in the hash dictionary. A list of processing nodes stores the nodes directly linked from the start node. A propagation section extracts one node from the list of processing nodes, extracts each next node of the one node from the list of next nodes, retrieves the identifiers of word-class sequences from the hash dictionary by the appearance number and the word-class of the each next node, respectively calculates a product of retrieved identifiers of the each next node and the identifiers in the interprocessing list of the one node, stores the product in the interprocessing list of the each next node, deletes the one node from the list of processing nodes, and adds the each next node in the list of processing nodes. This propagation process is repeated untill the list of processing nodes is empty.

20 Claims, 28 Drawing Sheets

SPEECH INPUT: NISHINOMIYA - INTERCHANGE - MADE - DONOKURAI?

MI CHI (7.250000) 0--3
NISHINOMIYA (7.100000) 0--9
 IMA (7.000000) 3--5
  INTER (7.500000) 10--14
  INTERCHANGE (7.500000) 10--20
   IMA (7.333333) 20--22
   MADE (7.000000) 21--24
    DONOKURAI (6.666667) 25--33

FIG. 5

| | |
|---|---|
| NODE ID | INPUT ELEMENT ID: WORD EXPRESSION |
| WORD-CLASS | |
| LIST OF ANTECEDENT NODES | |
| LIST OF NEXT NODES | |
| LIST OF UNPROCESSED ANTECEDENT NODES | |
| INTER PROCESSING LIST | |

FIG. 7

| | |
|---|---|
| NODE ID | 14: INTER |
| WORD-CLASS | VIAPOINT |
| LIST OF ANTECEDENT NODES | [07: IMA, 03: NISHINOMIYA] |
| LIST OF NEXT NODES | [18: IMA, 20: MADE] |
| LIST OF UNPROCESSED ANTECEDENT NODES | [07: IMA, 03: NISHINOMIYA] |
| INTER PROCESSING LIST | |

FIG. 8

DICTIONARY OF SENTENCE-TYPES g1: ((PLACE|(VIAPOINT) (VIAPOINT NAME)|(PRONOUN: PRONOUN PLACE <SOKO>)) -[(DISTANCE)]-((INTERROGATIVE: HOW_MUCH<DOREKURAI>)|(INTERROGATIVE: HOW_MUCH TIME)|(INTERROGATIVE: HOW_MUCH DISTANCE)))

g2: ((PLACE PROPER NOUN: PLACE NAME)|(VIAPOINT) (VIAPOINT NAME)) - (INTERROGATIVE: WHAT: WHAT OBJECT) - ((SIGN)|(PLACE: INSTITUTION < EATING HOUSE >)) - (ACTION: EXISTENCE: EXISTENCE NORMAL)

FIG. 10

DICTIONARY OF PATTERNS OF WORD-CLASS SEQENCES

SP01-g1: (PLACE) (INTERROGATIVE: HOW_MUCH < DOREKURAI >)
SP02-g1: (PLACE) (DISTANCE) (INTERROGATIVE: HOW_MUCH < DOREKURAI >)
SP03-g1: (PLACE) (INTERROGATIVE: HOW_MUCH TIME)
SP04-g1: (PLACE) (DISTANCE) (INTERROGATIVE: HOW_MUCH TIME)
SP05-g1: (PLACE) (INTERROGATIVE: HOW_MUCH DISTANCE)
SP06-g1: (PLACE) (DISTANCE) (INTERROGATIVE: HOW_MUCH DISTANCE)
SP07-g1: (VIAPOINT NAME) (VIAPOINT) (INTERROGATIVE: HOW_MUCH < DOREKURAI >)
SP08-g1: (VIAPOINT NAME) (VIAPOINT) (DISTANCE) (INTERROGATIVE: HOW_MUCH < DOREKURAI >)
SP09-g1: (VIAPOINT NAME) (VIAPOINT) (INTERROGATIVE: HOW_MUCH TIME)
SP10-g1: (VIAPOINT NAME) (VIAPOINT) (DISTANCE) (INTERROGATIVE: HOW_MUCH TIME)
SP11-g1: (VIAPOINT NAME) (VIAPOINT) (INTERROGATIVE: HOW_MUCH DISTANCE)
SP12-g1: (VIAPOINT NAME) (VIAPOINT) (DISTANCE) (INTERROGATIVE: HOW_MUCH DISTANCE)
SP13-g1: (PRONOUN: PRONOUN PLACE < SOKO >) (INTERROGATIVE: HOW_MUCH < DOREKURAI >)
SP14-g1: (PRONOUN: PRONOUN PLACE < SOKO >) (DISTANCE) (INTERROGATIVE: HOW_MUCH < DOREKURAI >)
SP15-g1: (PRONOUN: PRONOUN PLACE < SOKO >) (INTERROGATIVE: HOW_MUCH TIME)
SP16-g1: (PRONOUN: PRONOUN PLACE < SOKO >) (DISTANCE) (INTERROGATIVE: HOW_MUCH TIME)
SP17-g1: (PRONOUN: PRONOUN PLACE < SOKO >) (INTERROGATIVE: HOW_MUCH DISTANCE)
SP18-g1: (PRONOUN: PRONOUN PLACE < SOKO >) (DISTANCE) (INTERROGATIVE: HOW_MUCH DISTANCE)
SP01-g2: (PLACE PROPER NOUN: PLACE NAME) (INTERROGATIVE: WHAT: WHAT OBJECT) (SIGN) (ACTION: EXISTENCE: EXISTENCE NORMAL)
SP02-g2: (PLACE PROPER NOUN: PLACE NAME) (INTERROGATIVE: WHAT: WHAT OBJECT) (PLACE: INSTITUTION < EATING HOUSE >) (ACTION: EXISTENCE: EXISTENCE NORMAL)
SP03-g2: (VIAPOINT NAME) (VIAPOINT) (INTERROGATIVE: WHAT: WHAT OBJECT) (SIGN) (ACTION: EXISTENCE: EXISTENCE NORMAL)
SP04-g2: (VIAPOINT NAME) (VIAPOINT) (INTERROGATIVE: WHAT: WHAT OBJECT) (PLACE: INSTITUTION < EATING HOUSE >) (ACTION: EXISTENCE: EXISTENCE NORMAL)

FIG. 11

HASH DICTIONARY OF WORD-CLASS SEQUENCES

| WORD-CLASS | WORD APPEARANCE NUMBER 1 |
| --- | --- |
| | ID LIST OF WORD-CLASS SEQUENCES |
| (VIAPOINT NAME) | [SP03-g2, SP04-g2, SP07-g1, SP08-g1, SP09-g1, SP10-g1, SP11-g1, SP12-g1] |
| (PLACE) | [SP01-g1, SP02-g1, SP03-g1, SP04-g1, SP05-g1, SP06-g1] |
| (PLACE PROPER NOUN: PLACE NAME) | [SP01-g2, SP02-g2] |
| (PRONOUN: PRONOUN PLACE < SOKO >) | [SP16-g1, SP13-g1, SP14-g1, SP15-g1, SP17-g1, SP18-g1] |

| WORD-CLASS | WORD APPEARANCE NUMBER 2 |
| --- | --- |
| | ID LIST OF WORD-CLASS SEQUENCES |
| (INTERROGATIVE: HOW_MUCH < DOREKURAI >) | [SP01-g1, SP13-g1] |
| (INTERROGATIVE: HOW_MUCH DISTANCE) | [SP05-g1, SP17-g1] |
| (INTERROGATIVE: HOW_MUCH TIME) | [SP03-g1, SP15-g1] |
| (INTERROGATIVE: WHAT: WHAT OBJECT) | [SP01-g2, SP02-g2] |
| (VIAPOINT) | [SP08-g1, SP09-g1, SP10-g1, SP11-g1, SP12-g1, SP07-g1, SP03-g2, SP04-g2] |
| (DISTANCE) | [SP02-g1, SP04-g1, SP14-g1, SP06-g1, SP16-g1, SP18-g1] |

| WORD-CLASS | WORD APPEARANCE NUMBER 3 |
| --- | --- |
| | ID LIST OF WORD-CLASS SEQUENCES |
| (INTERROGATIVE: HOW_MUCH <DOREKURAI>) | [SP02-g1, SP07-g1, SP14-g1] |
| (INTERROGATIVE: HOW_MUCH DISTANCE) | [SP06-g1, SP11-g1, SP18-g1] |
| (INTERROGATIVE: HOW_MUCH TIME) | [SP04-g1, SP09-g1, SP16-g1] |
| (INTERROGATIVE: WHAT: WHAT OBJECT) | [SP03-g2, SP04-g2] |
| (PLACE: INSTITUTION < EATING HOUSE >) | [SP02-g2] |
| (DISTANCE) | [SP08-g1, SP10-g1, SP12-g1] |
| (SIGN) | [SP01-g2] |

*FIG. 12*

HASH DICTIONARY OF WORD-CLASS SEQUENCES

| WORD-CLASS | WORD APPEARANCE NUMBER 4 |
|---|---|
| | ID LIST OF WORD-CLASS SEQUENCES |
| (INTERROGATIVE: HOW_MUCH <DOREKURAI >) | [SP08-g1] |
| (INTERROGATIVE: HOW_MUCH DISTANCE) | [SP12-g1] |
| (INTERROGATIVE: HOW_MUCH TIME) | [SP10-g1] |
| (PLACE: INSTITUTION < EATING HOUSE >) | [SP04-g2] |
| (ACTION: EXISTENCE: EXISTENCE NORMAL) | [SP01-g2, SP02-g2] |
| (SIGN) | [SP03-g2] |

| WORD-CLASS | WORD APPEARANCE NUMBER 5 |
|---|---|
| | ID LIST OF WORD-CLASS SEQUENCES |
| (ACTION: EXISTENCE: EXISTENCE NORMAL) | [SP03-g2, SP04-g2] |

| WORD-CLASS | WORD APPEARANCE NUMBER END |
|---|---|
| | ID LIST OF WORD-CLASS SEQUENCES |
| (INTERROGATIVE: HOW_MUCH <DOREKURAI >) | [SP01-g1, SP02-g1, SP07-g1, SP08-g1, SP13-g1, SP14-g1] |
| (INTERROGATIVE: HOW_MUCH DISTANCE) | [SP05-g1, SP06-g1, SP11-g1, SP12-g1, SP17-g1, SP18-g1] |
| (INTERROGATIVE: HOW_MUCH TIME) | [SP03-g1, SP04-g1, SP09-g1, SP10-g1, SP15-g1, SP16-g1] |
| (ACTION: EXISTENCE: EXISTENCE NORMAL) | [SP01-g2, SP02-g2, SP03-g2, SP04-g2] |

*FIG. 12 cont.*

SPEECH INPUT: NISHINOMIYA - INTERCHANGE - MADE - DOREKURAI - DESUKA?

```
01: MICHI (7.250000)0--3
02: MISE (7.250000)0--3
03: NISHINOMIYA (7.100000)0--9
04: NISHI (7.250000)0--3
    05: 2 (7.000000)0--1
     06: 1 (7.666667)1--3
      07: IMA (7.000000)3--5
       08: NAN (6.750000)4--7
        09: NONI (6.750000)4--7
         10: UMI (7.000000)5--7
           11: 2 (7.000000)6--7
            12: IYA (7.666667)7--9
             13: YOI (7.666667)8--10
               14: INTER (7.500000)10--14
               15: INTERCHANGE (7.500000)10--20
               16: DOU (8.000000)12--14
               17: 5 (8.000000)12--13
                     18: IMA (7.333333)20--22
                    19: MUKI (6.750000)21--24
                    20: MADE (7.000000)21--24
                    21: EKI (7.333333)22--24
                    22: KITA (6.500000)23--26
                    23: KEDO (6.500000)23--26
                       24: DONOKURAI (6.666667)25--33
                       25: DONO (6.000000)25--28
                      26: 5 (6.000000)25--26
                       27: ANO (6.333333)26--28
                        28: NUKERU (6.500000)27--32
                       29: MOTO (6.250000)27--30
                       30: GO (6.666667)28--30
                        31: ATO (6.666667)28--30
                        32: TARA (7.000000)29--32
                        33: KORE (7.000000)29--32
                        34: KURAI (7.200000)29--33
                        35: KARA (7.000000)29--32
                        36: ARE (7.333333)30--32
                        37: ARU (7.000000)30--32
                         38: YOI (7.666667)31--33
                         39: UE (7.500000)32--33
                           40: 5 (6.000000)34--35
                            41: GO (7.000000)38--40
                            42: ATO (7.000000)38--40
```

FIG. 13

DICTIONARY OF SENTENCE - TYPES

| | |
|---|---|
| WHERE | : (VIAPOINT NAME) (VIAPOINT) \| (INSTITUTION NAME) (INSTITUTION) \| (VIAPOINT) (RELATIVE ORDER) (ABSOLUTE ORDER) - (INSTITUTION) (VIAPOINT) (RELATIVE ORDER) (INSTITUTION) (VIAPOINT NAME) (VIAPOINT) (RELATIVE ORDER) (INSTITUTION) (WHERE) |
| HOWMUCH 1: | (VIAPOINT NAME) (VIAPOINT) \| (INSTITUTION NAME) (INSTITUTION) \| (VIAPOINT) (RELATIVE ORDER) (ABSOLUTE ORDER) - (INSTITUTION) \| (VIAPOINT) (RELATIVE ORDER) (INSTITUTION) (VIAPOINT NAME) (VIAPOINT) (RELATIVE ORDER) (INSTITUTION) (DISTANCE) (HOWMUCH) |
| HOWMUCH 2: | (VIAPOINT NAME) (VIAPOINT) \| (INSTITUTION NAME) (INSTITUTION) \| (VIAPOINT) (RELATIVE ORDER) (ABSOLUTE ORDER) - (INSTITUTION) \| (VIAPOINT) (RELATIVE ORDER) (INSTITUTION) (VIAPOINT NAME) (VIAPOINT) (RELATIVE ORDER) (INSTITUTION) (STARTING POINT) (VIAPOINT NAME) (VIAPOINT) \| (INSTITUTION NAME) (INSTITUTION) \| (VIAPOINT) (RELATIVE ORDER) (ABSOLUTE ORDER) - (INSTITUTION) \| (VIAPOINT) (RELATIVE ORDER) (INSTITUTION) (VIAPOINT NAME) (VIAPOINT) (RELATIVE ORDER) (INSTITUTION) (END POINT) (HOWMUCH) |

*FIG. 15*

DICTIONARY OF SENTENCE - TYPES

| | ( + PHRASE   PLACE PHRASE)   - NEEDS |
|---|---|
| P1 | :(VIAPOINT NAME) (VIAPOINT) |
| P2 | :(INSTITUTION NAME) (INSTITUTION) |
| P3 | :(VIAPOINT) (RELATIVE ORDER) (ABSOLUTE ORDER) (INSTITUTION) |
| P4 | :(VIAPOINT) (REALTIVE ORDER) (INSTITUTION) |
| P5 | :(VIAPOINT NAME) (VIAPOINT) (RELATIVE ORDER) (INSTITUTION) |

| | ( + PHRASE   ALL SEQUENCES)   ( - NEEDS   PLACE PHRASE) |
|---|---|
| WHERE | :(PLACE PHRASE) (WHERE) |
| HOWMUCH 1 | :(PLACE PHRASE) (DISTANCE) (HOWMUCH) |
| HOWMUCH 2 | :(PLACE PHRASE) (STARTING POINT) (PLACE PHRASE) (END POINT) - (HOWMUCH) |

*FIG. 16*

DICTIONARY OF PATTERNS OF HIERARCHICAL WORD-CLASS SEQUENCES ( + PHRASE    PLACE PHRASE     - NEEDS

| | | |
|---|---|---|
| P1 | #0 | :(VIAPOINT NAME) (VIAPOINT) |
| P2 | #0 | :(INSTITUTION NAME) (INSTITUTION) |
| P3 | #0 | :(VIAPOINT) (RELATIVE ORDER) (ABSOLUTE ORDER) (INSTITUTION) |
| P4 | #0 | :(VIAPOINT) (REALTIVE ORDER) (INSTITUTION) |
| P5 | #0 | :(VIAPOINT NAME) (VIAPOINT) (RELATIVE ORDER) (INSTITUTION) |

( + PHRASE    ALL SEQUENCES )      ( - NEEDS    PLACE PHRASE )

| | |
|---|---|
| WHERE | #0 :(PLACE PHRASE) (WHERE) |
| HOWMUCH 1 | #0 :(PLACE PHRASE) (DISTANCE) (HOWMUCH) |
| HOWMUCH 2 | #0 :(PLACE PHRASE) (STARTING POINT) (PLACE PHRASE) (END POINT) - (HOWMUCH) |

*FIG. 17*

HIERARCHICAL HASH DICTIONARY ( + PHRASE    PLACE PHRASE)        - NEEDS

| APPEARANCE POSITION: 1 | |
|---|---|
| VIAPOINT NAME | P1 #0, P5 #0 |
| INSTITUTION NAME | P2 #0 |
| VIAPOINT | P3 #0, P4 #0 |

| APPEARANCE POSITION: 2 | |
|---|---|
| VIAPOINT | P1 #0, P5 #0 |
| INSTITUTION NAME | P2 #0 |
| RELATIVE ORDER | P3 #0, P4 #0 |

| APPEARANCE POSITION: 3 | |
|---|---|
| ABSOLUTE ORDER | P3 #0 |
| INSTITUTION | P4 #0 |
| RELATIVE ORDER | P5 #0 |

| APPEARANCE POSITION: 4 | |
|---|---|
| INSTITUTION | P5 #0 |

| APPEARANCE POSITION: END | |
|---|---|
| VIAPOINT | P1 #0 |
| INSTITUTION | P2 #0, P3 #0, P4 #0, P5 #0 |

( + PHRASE    ALL SEQUENCES) ( - NEEDS PLACE PHRASE)

| APPEARANCE POSITION: 1 | |
|---|---|
| PLACE PHRASE | WHERE #0, HOWMUCH1 #0, HOWMUCH2 #0 |

| APPEARANCE POSITION: 2 | |
|---|---|
| WHERE | WHERE #0 |
| DISTANCE | HOWMUCH1 #0 |
| STARTING POINT | HOWMUCH2 #0 |

| APPEARANCE POSITION: 3 | |
|---|---|
| HOWMUCH | HOWMUCH1 #0 |
| PLACE PHRASE | HOWMUCH2 #0 |

| APPEARANCE POSITION: 4 | |
|---|---|
| END POINT | HOWMUCH2 #0 |

| APPEARANCE POSITION: 5 | |
|---|---|
| HOWMUCH | HOWMUCH2 #0 |

| APPEARANCE POSITION: END | |
|---|---|
| WHERE | WHERE #0 |
| HOWMUCH | HOWMUCH1 #0, HOWMUCH2 #0 |

*FIG. 18*

LIST OF HIERARCHICAL CONNECTABLE WORD-CLASSES

| (+ PHRASE   PLACE PHRASE) | - NEEDS |
|---|---|
| SENTENCE HEAD | : VIAPOINT NAME, VIAPOINT, INSTITUTION NAME |
| VIAPOINT NAME | : VIAPOINT |
| VIAPOINT | : RELATIVE ORDER, SENTENCE END |
| INSTITUTION NAME | : INSTITUTION |
| INSTITUTION | : SENTENCE END |
| RELATIVE ORDER | : INSTITUTION ORDER, ABSOLUTE ORDER |
| ABSOLUTE ORDER | : INSTITUTION |

| (+ PHRASE   ALL SEQUENCES) | (- NEEDS   PLACE PHRASE) |
|---|---|
| SENTENCE HEAD | : PLACE PHRASE |
| PLACE PHRASE | : WHERE, DISTANCE, STARTING POINT |
| DISTANCE | : HOWMUCH |
| STARTING POINT | : PLACE PHRASE |
| END POINT | : HOWMUCH |
| WHERE | : SENTENCE END |
| HOWMUCH | : SENTENCE END |

FIG. 19

| | |
|---|---|
| NISHINOMOIYA | < 0- 9 > |
| INTER | < 10-14 > |
| MAE | < 17-19 > |
| TEN | < 20-23 > |
| KARA | < 21-24 > |
| SERVICE - AREA | < 25-35 > |
| AOKI | < 26-30 > |
| MADE | < 36-39 > |
| TEN | < 36-39 > |
| DOREKURAI | < 40-48 > |

FIG. 20

| | | |
|---|---|---|
| NISHINOMIYA | < 0- 9 > | VIAPOINT NAME, INSTITUTION NAME |
| INTER | < 10-14 > | VIAPOINT |
| MAE | < 17-19 > | RELATIVE ORDER |
| TEN | < 20-23 > | INSTITUTION |
| KARA | < 21-24 > | DISTANCE, STARTING POINT |
| SERVICE - AREA | < 25-35 > | INSTITUTION |
| AOKI | < 26-30 > | VIAPOINT NAME, INSTITUTION NAME |
| MADE | < 36-39 > | DISTANCE, END POINT |
| TEN | < 36-39 > | INSTITUTION |
| DOREKURAI | < 40-48 > | HOWMUCH |

FIG. 21

NISHINOMIYA (VIAPOINT NAME) - INTER (VIAPOINT)
NISHINOMIYA (VIAPOINT NAME) - INTER (VIAPOINT) - MAE (RELATIVE ORDER) - TEN (INSTITUTION)
NISHINOMIYA (VIAPOINT NAME) - INTER (VIAPOINT) - MAE (RELATIVE ORDER) - SERVICE AREA (INSTITUTION)
AOKI (INSTITUTION NAME) - TEN (INSTITUTION)

FIG. 23

| | | |
|---|---|---|
| NISHINOMIYA | < 0- 9 > | VIAPOINT NAME, INSTITUTION NAME |
| INTER | < 10-14 > | VIAPOINT |
| MAE | < 17-19 > | RELATIVE ORDER |
| TEN | < 20-23 > | INSTITUTION |
| KARA | < 21-24 > | DISTANCE, STARTING POINT |
| SERVICE - AREA | < 25-35 > | INSTITUTION |
| AOKI | < 26-30 > | VIAPOINT NAME, INSTITUTION NAME |
| MADE | < 36-39 > | DISTANCE, END POINT |
| TEN | < 36-39 > | INSTITUTION |
| DOREKURAI | < 40-48 > | HOWMUCH |
| NISHINOMIYA-INTER | < 0-14 > | PLACE PHRASE |
| NISHINOMIYA-INTER-MAE-TEN | < 0-23 > | PLACE PHRASE |
| NISHINOMIYA-INTER-MAE-SERVICE AREA | < 0-35 > | PLACE PHRASE |
| AOKI - TEN | < 26-39 > | PLACE PHRASE |

FIG. 24

NISHINOMIYA (VIAPOINT NAME) - INTER (VIAPOINT) - MAE (RELATIVE ORDER) - SERVICE AREA (INSTITUTION) - MADE (DISTANCE) - DOREKURAI (HOWMUCH)

*FIG. 26*

| | |
|---|---|
| WHERE #0 | VIAPOINT NAME, VIAPOINT, WHERE |
| WHERE #1 | INSTITUTION NAME, INSTITUTION, WHERE |
| WHERE #2 | VIAPOINT, RELATIVE ORDER, ABSOLUTE ORDER, INSTITUTION, WHERE |
| WHERE #3 | VIAPOINT, RELATIVE ORDER, INSTITUTION, WHERE |
| WHERE #4 | VIAPOINT NAME, VIAPOINT, RELATIVE ORDER, INSTITUTION, WHERE |
| HOWMUCH#0 | VIAPOINT NAME, VIAPOINT, DISTANCE, HOWMUCH |
| HOWMUCH#1 | INSTITUTION NAME, INSTITUTION, DISTANCE, HOWMUCH |
| HOWMUCH#2 | VIAPOINT, RELATIVE ORDER, ABSOLUTE ORDER, INSTITUTION, DISTANCE, HOWMUCH |
| HOWMUCH#3 | VIAPOINT, RELATIVE ORDER, INSTITUTION, DISTANCE, HOWMUCH |
| HOWMUCH#4 | VIAPOINT NAME, VIAPOINT, RELATIVE ORDER, INSTITUTION, DISTANCE, HOWMUCH |
| HOWMUCH1#0 | VIAPOINT NAME, VIAPOINT, STARTING POINT, VIAPOINT NAME, VIAPOINT, END POINT, HOWMUCH |
| HOWMUCH1#1 | VIAPOINT NAME, VIAPOINT, STARTING POINT, INSTITUTION NAME, INSTITUTION, END POINT, HOWMUCH |
| HOWMUCH1#2 | VIAPOINT NAME, VIAPOINT, STARTING POINT, VIAPOINT, RELATIVE ORDER, ABSOLUTE ORDER, INSTITUTION, END POINT,, HOWMUCH |
| HOWMUCH1#3 | VIAPOINT NAME, VIAPOINT, STARTING POINT, VIAPOINT, RELATIVE ORDER, INSTITUTION, END POINT, HOWMUCH |
| HOWMUCH1#4 | VIAPOINT NAME, VIAPOINT, STARTING POINT, VIAPOINT NAME, VIAPOINT, RELATIVE ORDER, INSTITUTION, END POINT, HOWMUCH |
| HOWMUCH2#5 | INSTITUTION NAME, INSTITUTION, STARTING POINT, VIAPOINT NAME, VIAPOINT, END POINT, HOWMUCH |
| HOWMUCH2#6 | INSTITUTION NAME, INSTITUTION, STARTING POINT, INSTITUTION NAME, INSTITUTION, END POINT, HOWMUCH |
| HOWMUCH2#7 | INSTITUTION NAME, INSTITUTION, STARTING POINT, VIAPOINT, RELATIVE ORDER, ABSOLUTE ORDER, INSTITUTION, END POINT, HOWMUCH |
| HOWMUCH2#8 | INSTITUTION NAME, INSTITUTION, STARTING POINT, VIAPOINT, RELATIVE ORDER, INSTITUTION, END POINT, HOWMUCH |
| HOWMUCH2#9 | INSTITUTION NAME, INSTITUTION, STARTING POINT, VIAPOINT NAME, VIAPOINT, RELATIVE ORDER, INSTITUTION, END POINT, HOWMUCH |
| HOWMUCH2#10 | VIAPOINT, RELATIVE ORDER, ABSOLUTE ORDER, INSTITUTION, STARTING POINT, VIAPOINT NAME, VIAPOINT, END POINT, HOWMUCH |
| HOWMUCH2#11 | VIAPOINT, RELATIVE ORDER, ABSOLUTE ORDER, INSTITUTION, STARTING POINT, INSTITUTION NAME, INSTITUTION, END POINT, HOWMUCH |
| HOWMUCH2#12 | VIAPOINT, RELATIVE ORDER, ABSOLUTE ORDER, INSTITUTION, STARTING POINT, VIAPOINT, RELATIVE ORDER, ABSOLUTE ORDER, INSTITUTION, END POINT, HOWMUCH |
| HOWMUCH2#13 | VIAPOINT, RELATIVE ORDER, ABSOLUTE ORDER, INSTITUTION, STARTING POINT, VIAPOINT, RELATIVE ORDER, INSTITUTION, END POINT, HOWMUCH |
| HOWMUCH2#14 | VIAPOINT, RELATIVE ORDER, ABSOLUTE ORDER, INSTITUTION, STARTING POINT, VIAPOINT NAME, VIAPOINT, RELATIVE ORDER, INSTITUTION, END POINT, HOWMUCH |
| HOWMUCH2#15 | VIAPOINT, RELATIVE ORDER, INSTITUTION, STARTING POINT, VIAPOINT NAME, VIAPOINT, END POINT, HOWMUCH |
| HOWMUCH2#16 | VIAPOINT, RELATIVE ORDER, INSTITUTION, STARTING POINT, INSTITUTION NAME, INSTITUTION, END POINT, HOWMUCH |
| HOWMUCH2#17 | VIAPOINT, RELATIVE ORDER, INSTITUTION, STARTING POINT, VIAPOINT, RELATIVE ORDER, ABSOLUTE ORDER, INSTITUTION, END POINT, HOWMUCH |
| HOWMUCH2#18 | VIAPOINT, RELATIVE ORDER, INSTITUTION, STARTING POINT, VIAPOINT, RELATIVE ORDER, INSTITUTION, END POINT, HOWMUCH |
| HOWMUCH2#19 | VIAPOINT, RELATIVE ORDER, INSTITUTION, STARTING POINT, VIAPOINT NAME, VIAPOINT, RELATIVE ORDER, INSTITUTION, END POINT, HOWMUCH |
| HOWMUCH2#20 | VIAPOINT NAME, VIAPOINT, RELATIVE ORDER, INSTITUTION, STARTING POINT, VIAPOINT NAME, VIAPOINT, END POINT, HOWMUCH |
| HOWMUCH2#21 | VIAPOINT NAME, VIAPOINT, RELATIVE ORDER, INSTITUTION, STARTING POINT, INSTITUTION NAME, INSTITUTION, END POINT, HOWMUCH |
| HOWMUCH2#22 | VIAPOINT NAME, VIAPOINT, RELATIVE ORDER, INSTITUTION, STARTING POINT, VIAPOINT, RELATIVE ORDER, ABSOLUTE ORDER, INSTITUTION, END POINT, HOWMUCH |
| HOWMUCH2#23 | VIAPOINT NAME, VIAPOINT, RELATIVE ORDER, INSTITUTION, STARTING POINT, VIAPOINT, RELATIVE ORDER, INSTITUTION, END POINT, HOWMUCH |
| HOWMUCH2#24 | VIAPOINT NAME, VIAPOINT, RELATIVE ORDER, INSTITUTION, STARTING POINT, VIAPOINT NAME, VIAPOINT, RELATIVE ORDER, INSTITUTION, END POINT, HOWMUCH |

| APPEARANCE POSITION: 1 | |
|---|---|
| VIAPOINT NAME | WHERE#0, WHERE#4, HOWMUCH1#0, HOWMUCH1#4, HOWMUCH2#0, HOWMUCH2#1, HOWMUCH2#2, HOWMUCH2#3, HOWMUCH2#4, HOWMUCH2#20, HOWMUCH2#21, HOWMUCH2#22, HOWMUCH2#23, HOWMUCH2#24 |
| INSTITUTION NAME | WHERE#1, HOWMUCH1#1, HOWMUCH2#5, HOWMUCH 2#6, HOWMUCH 2#7, HOWMUCH2#8, HOWMUCH2#9 |
| VIAPOINT | WHERE#2, WHERE#3, HOWMUCH1#2, HOWMUCH1#3, HOWMUCH2#10, HOWMUCH2#11, HOWMUCH2#12, HOWMUCH2#13, HOWMUCH2#14, HOWMUCH2#15, HOWMUCH2#16, HOWMUCH2#17, HOWMUCH2#18, HOWMUCH2#19 |

INFORMATION ANALYSIS AND METHOD

BACKGROUND OF THE INVENTION

1. Field of the Invention

The present invention relates to an information analysis apparatus and a method for recognizing a user's speech input sentence as a word-lattice in which a plurality of word candidates are linked and for identifying an acceptable word sequences from the word-lattice.

2. Description of the Related Art

Recently, by development of computer technology, a user can input various kinds of information to a computer as a natural method, and a technique to promote the use of the information is required. For example, a computer may be equipped with a microphone and A/D converter. In this case, when the user speaks his request to the computer, the computer recognizes the user's input speech and interprets his request. In short, the importance of this technique increases.

In the case of speech recognition, as a problem of the prior art, in general, the user's intention in his input speech often does not yield a correct recognition result. In short, in the recognition processing of the input signal, the recognition ratio of "100%" is not expected and a plurality of recognition candidates for one utterance word are often generated. Therefore, when the user utters a sentence, a lattice format in which a plurality of words are linked in order is generated as the recognition result. In order to utilize the user's input by general application program, a post processing technique to quickly determine the correct sentence as the user's input from the recognition result is important.

As the post processing technique, for example, the user's input sentence is determined from the lattice structure of the speech recognition. In this case, as the prior art, a plurality of sentence candidates are generated from the lattice structure and a natural language sentence structure technique is applied for each sentence candidate. For example, in Japanese Patent Disclosure (Kokai) H5-197389, while a lattice of the recognition result obtained from a few word candidates is expanded, an acceptable sentence consisting of simple grammar is identified from the lattice. (In this case, the lattice consists of word candidates and character candidates linked in order from a start node to an end node as the recognition result of the speech input sentence.)

However, in general, the lattice structure includes a large number of word candidates linked in a complicated manner because the input sentence to be recognized includes a large number of vocabulary and complicated grammar used for a dialogue between two persons. For example, for the user's utterance sentence "Nishinomiya-interchange-made-dorekurai-desuka?" [How long does it take to Nishinomiya interchange], a processing result of word-spotting as speech recognition is shown in FIG. 13. In FIG. 13, one word candidate per line is shown as "ID: word candidate (recognition score) word interval in signal frame". As for the speech input from 0-frame to 40-frame, 42 words including the correct 4 words are obtained. As a result, 38 words are included as false alarms. Assume that the lattice structure obtained from the word spotting result is expanded. Even if a restriction such as the time-appearance position between words is applied, several million word candidates are generated. Therefore, a method to expand the lattice structure is not effective for both calculation quantity and memory quantity.

Furthermore, as an analysis method higher than the expansion method, Japanese Patent disclosure (Kokai) H9-134369 is well known. In this method, an input lattice is expanded as a tree structure in which a head of the lattice is a root, and the tree structure is analyzed by referring to a try-dictionary for quickly analysis. Accordingly, in comparison with the prior method to simply expand all word candidates in the lattice structure, the number of word candidates to be analyzed is reduced because the input lattice is expanded as the tree condition. The analysis is quickly executed by using the try dictionary. However, as for the lattice structure including large ambiguity such as the large number of word candidates as shown in FIG. 13, a number of analysis processing iterations greatly increases. In addition to this, the number of retrieval times for the try-dictionary greatly increases while word sequence candidates on interprocessing remaines in the lattice structure.

As mentioned-above, in the prior art, in case of analysis of the lattice structure as a recognition result of the user's speech input sentence, a large quantity of calculation and memory capacity are necessary. As a result, analysis by expanding the input lattice is impossible.

SUMMARY OF THE INVENTION

It is an object of the present invention to provide an information analysis apparatus and method able to quickly extract an acceptable word sequences from the word-lattice as a speech recognition result without expanding the word-lattice.

According to the present invention, there is provided an information analysis apparatus, which connects after a speech recognizer for recognizing a user's speech input sentence and for generating a word-lattice linking a plurality of words from a start node to an end node as recognition candidates of the speech input sentence, for accepting the word-lattice as input and for generating a set of acceptable word sequences by referring to a word-class dictionary that matches each word to corresponding word-class and to a grammar that matches each word-class sequence to corresponding sentence type, comprising: a hash dictionary means for storing a plurality of identifiers of word-class sequences, each of which represents a sentence by unit of the word-class and word appearance number, the word-class being positioned at the word appearance number in the word-class sequence; an initialization means for forming a node for each word in the word-lattice, the node consisting of the word-class, an interprocessing list, lists of next nodes and unprocessed antecedent nodes in the word-lattice, the interprocessing list of the node directly linked from the start node representing the identifiers of word-class sequences for corresponding word-class and the word appearance number "1" in said hash dictionary means, and for forming a list of processing nodes representing the nodes directly linked from the start node; a propagation means for extracting one node from the list of processing nodes if the list of unprocessed antecedent nodes of the one node is empty, for extracting each next node of the one node from the list of next nodes if the list of next nodes is not empty, for retrieving the identifiers of word-class sequences from said hash dictionary means by the word appearance number as link order and the word-class of the each next node, for respectively calculating a product of retrieved identifiers of the each next node and the identifiers in the interprocessing list of the one node, for storing the product as propagated identifiers in the interprocessing list of the each next node, for deleting the one node from the list of unprocessed antecedent nodes of the each next node and from the list of processing nodes, and for adding the each next node in the list of processing nodes; a repeat means for repeating the process of said propagation means until the list of processing nodes is empty; and word sequence extraction means for extracting the propagated identifiers of the end node if the list of processing nodes is empty, and for extracting the word sequences corresponding to the word-class sequences of the propagated identifiers from the word-lattice.

Further in accordance with the present invention, there is provided an information analysis apparatus, which connects after a speech recognizer for recognizing a user's speech input sentence and for generating a word-lattice linking a plurality of words from a start node to an end node as recognition candidates of the speech input sentence, for accepting the word-lattice as input and for generating a set of acceptable word sequences by referring to a word-class dictionary that matches each word to corresponding word-class and to a grammar that matches each word-class sequence to corresponding sentence type, comprising: a hierarchical hash dictionary means for storing a plurality of identifiers of partial word-class sequences each of which represents a phrase in a sentence by unit of the word-class and word appearance number, the word-class being positioned at the word appearance number in the partial word-class sequence, and for storing a plurality of identifiers of word-class sequences, each of which represents the sentence by unit of the word-class, the phrase and appearance number, the word-class or the phrase being positioned at the appearance number in the sentence; an initialization means for forming a node for each word in the word-lattice, the node consisting of the word-class, an interprocessing list, lists of next nodes and unprocessed antecedent nodes in the word-lattice, the interprocessing list of the node directly linked from the start node representing the identifiers of partial word-class sequences for corresponding word-class and the word appearance number "1" in said hierarchical hash dictionary means, and for forming a list of processing nodes representing the nodes directly linked from the start node; a first propagation means for extracting one node from the list of processing nodes if the list of the unprocessed antecedent nodes of the one node is empty, for extracting each next node of the one node from the list of next nodes if the list of next node is not empty, for retrieving the identifiers of partial word-class sequences from said hierarchical hash dictionary means by the word appearance number as link order and the word-class of each next node, for respectively calculating a product of retrieved identifiers of each next node and the identifiers in the interprocessing list of the one node, for storing the product in the interprocessing list of each next node, for deleting the one node from the list of unprocessed antecedent nodes of each next node and from the list of processing nodes, and for adding each next node in the list of processing nodes; a first repeat means for repeating the process of said first propagation means until the list of processing nodes is empty; a partial word sequence extraction means for extracting a partial word sequence corresponding to the partial word-class sequence in the word-lattice if the list of processing nodes is empty and the partial word-class sequence is identified in the word-lattice; a node addition means for adding a phrase node as the partial word sequence in the word-lattice, the phrase node consisting of an interprocessing list, lists of next nodes and unprocessed antecedent nodes in the word-lattice, and for initializing the interprocessing list of each node and the list of processing nodes, the interprocessing list of the node and the phrase node directly linked from the start node representing the identifiers of word-class sequences for a corresponding word-class and the appearance number "1" in said hierarchical hash dictionary means, the list of processing nodes representing the node being the phrase node directly linked from the start node; a second repeat means for repeating process of said first propagation means, first repeat means, partial word sequence extraction means and node addition means for other phrase if a plurality of phrases are defined in said hierarchical hash dictionary means and the other phrase does not include a phrase not added in the word-lattice; a second propagation means for extracting one node from the list of processing nodes if the list of the unprocessed antecedent nodes of the one node is empty, for extracting each next node of the one node from the list of next nodes if the list of next node is not empty, for retrieving the identifiers of word-class sequences from said hierarchical hash dictionary means by the appearance number as the link order and the word-class of each next node, for respectively calculating a product of retrieved identifiers of each next node and the identifiers in the interprocessing list of the one node, for storing the product as propagated identifiers in the interprocessing list of each next node, for deleting the one node from the list of unprocessed antecedent nodes of each next node and from the list of processing nodes, and for adding each next node in the list of processing nodes; third repeat means for repeating process of said second propagation means untill the list of processing nodes is empty; and a word sequence extraction means for extracting the propagated identifiers of the end node if the list of processing nodes is empty, and for extracting the word sequence corresponding to the word-class sequences of the propagated identifiers from the word-lattice.

BRIEF DESCRIPTION OF THE DRAWINGS

FIG. 5 is a schematic diagram of the recognition result as the word-spotting processing.

FIG. 7 is a schematic diagram of the data structure of each node in the word-lattice.

FIG. 8 is a schematic diagram of the data structure of the node when initialization processing is completed.

FIG. 10 is a schematic diagram of the one example of a dictionary of sentence-types in the first embodiment.

FIG. 11 is a schematic diagram of one example of a dictionary of patterns of the word-class sequences in the first embodiment.

FIG. 12 is a schematic diagram of one example of a hash dictionary of the word-class sequences in the first embodiment.

FIG. 13 is a schematic diagram of one example of the word-spotting result.

FIG. 15 is a schematic diagram of one example of a dictionary of sentence-types in a propagation method of the sentence-type.

FIG. 16 is a schematic diagram of one example of a dictionary of sentence-types in the second embodiment.

FIG. 17 is a schematic diagram of one example of a dictionary of patterns of hierarchical word-class sequences in the second embodiment.

FIG. 18 is a schematic diagram of one example of a hierarchical hash dictionary in the second embodiment.

FIG. 19 is a schematic diagram of one example of a list of hierarchical connectable word-class in the second embodiment.

FIG. 20 is a schematic diagram of one example of an input recognition result.

FIG. 21 is a schematic diagram of one example of a node list at initialization mode in the second embodiment.

FIG. 23 is a schematic diagram of one example of the place phrase generated in the second embodiment.

FIG. 24 is a schematic diagram of one example of the node list in case of registration of the place phrase.

FIG. 26 is a schematic diagram of one example of all sequences generated in the second embodiment.

FIG. 27 is a schematic diagram of one example of the dictionary of patterns of word-classes in the propagation method of sentence-types.

FIG. 28 is a schematic diagram of one example of the hash dictionary in the propagation method of sentence-types.

DETAILED DESCRIPTION OF THE PREFERRED EMBODIMENTS

Embodiments of the present invention are described below with reference to the drawings. In the present invention, when the user utters a sentence, the lattice format in which a plurality of word candidates are linked in order is generated and the lattice format is analyzed. In this case, by referring to the hash dictionary of word-class sequences, the lattice format is quickly analyzed without expanding the lattice format. In this way, the acceptable word-class sequence is extracted from the lattice format.

Word class refers to the generic concept of classifying words. Thus, a thesaurus is one example of a "word class" system that groups words according to meaning. Words may also be classified according parts of grammar. Therefore, nouns, verbs, adverbs, etc. may also be classified according to sentence position as, for example, in the disclosed hash dictionary.

While the examples in this specification are given in the Japanese language, the present invention is not limited to any particular language. Rather, the invention applies to speech recognition regardless of the language used. The invention thus applies to the English language. The examples are given in Japanese to provide continuity with the priority application. In some cases, English translations are provided in brackets to aid the understanding of the reader.

Figure 1:
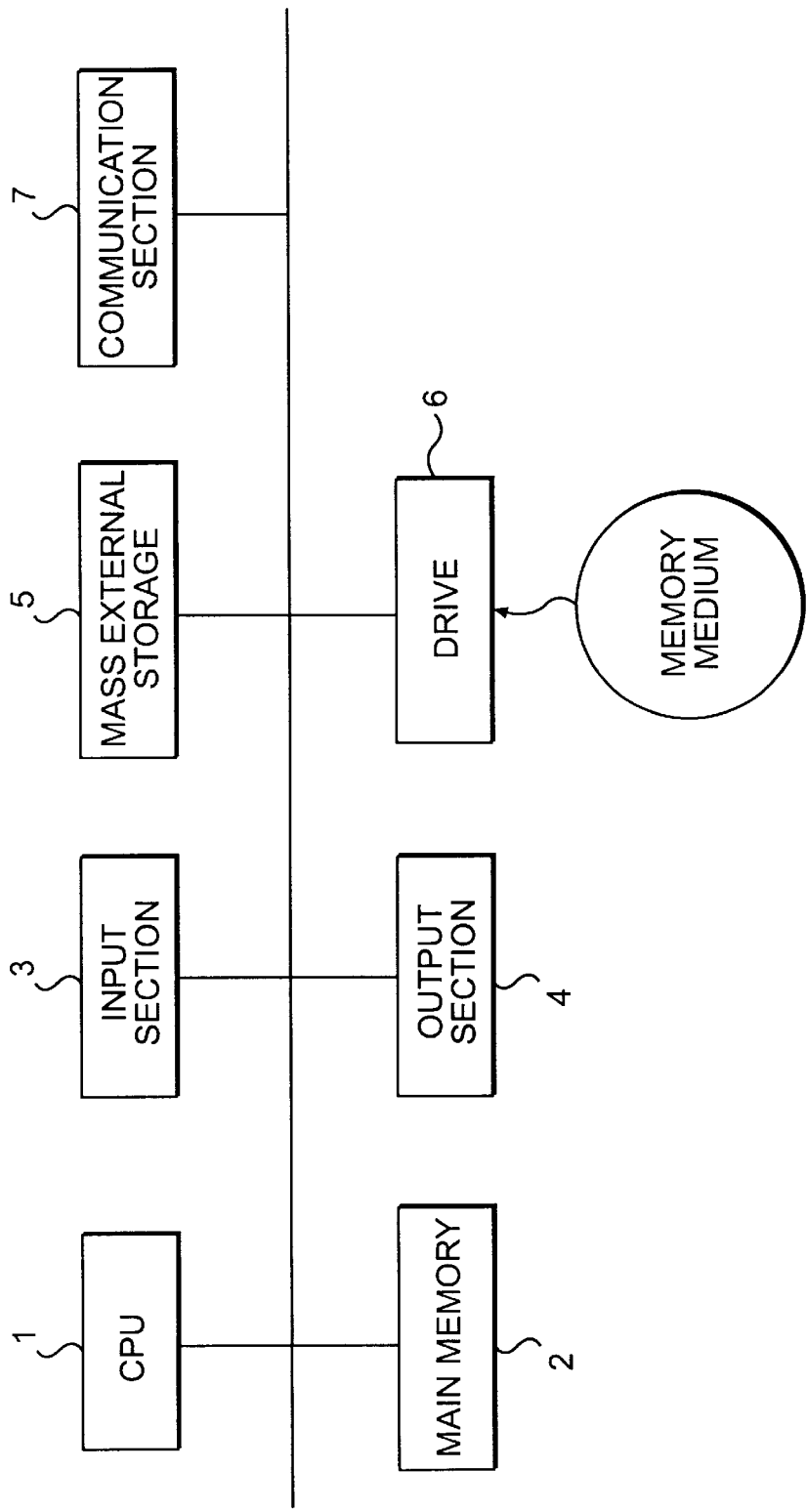
FIG. 1 is a block diagram of the information analysis apparatus according to a first embodiment of the present invention.

FIG. 1 is a block diagram of the information analysis apparatus according to the first embodiment of the present invention. A main memory 2 stores a program to realize each function of the information analysis apparatus. A CPU 1 executes each kind of processing by using the program in the main memory 2. An input section 3 inputs the user's speech and recognizes it as the input sentence. This input data is supplied to the CPU 1. An output section 4 outputs the recognition result or the acceptable sentence pattern (word-class sequence) through a display. In addition to this, a mass external storage 5 such as a hard disk or an optical disk, a drive section 6 to access a handy memory device such as the optical disk, CD-ROM, CD-R, CD-RW, or DVD, and a communication section 7 to communicate to an external system, are attached to the information analysis apparatus.

Figure 2:
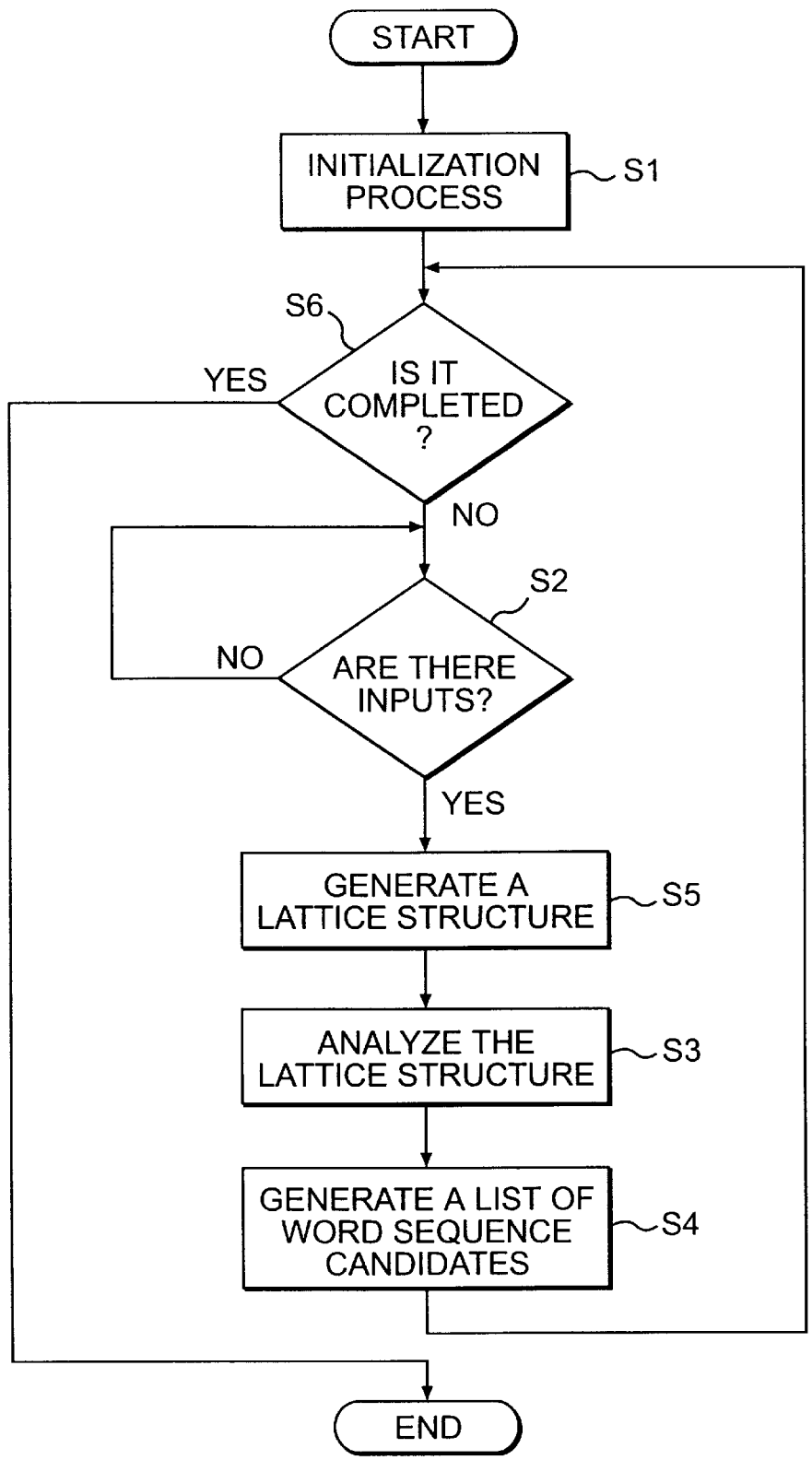
FIG. 2 is a flow chart of the processing of the information analysis method according to the first embodiment of the present invention.

FIG. 2 is a flow chart of the processing of the information analysis method according to the first embodiment of the present invention. The information analysis processing of the present invention consists of (i) an initialization process, (ii) a lattice structure process, (iii) a lattice analysis process, and (iv) forming a process of the word sequence candidates list. At the begining, CPU 1 executes the initialization process (S1). Then, until the completion is selected, one cycle of the analysis process is executed, which is the lattice structure process, the lattice analysis process, and the forming process of the word sequence candidates list. At the lattice structure process (ii), when the recognition result of the input information is supplied (S2), the word-lattice is generated from the recognition result (S3). At the lattice analysis process (iii), the word-lattice is analyzed, and acceptable word-class sequences are extracted from the word-lattice (S3). At the forming process of the word sequence candidates list, the word-lattice is scanned according to the acceptable word-class sequences and an acceptable word sequence is obtained (S4).

Figure 9:
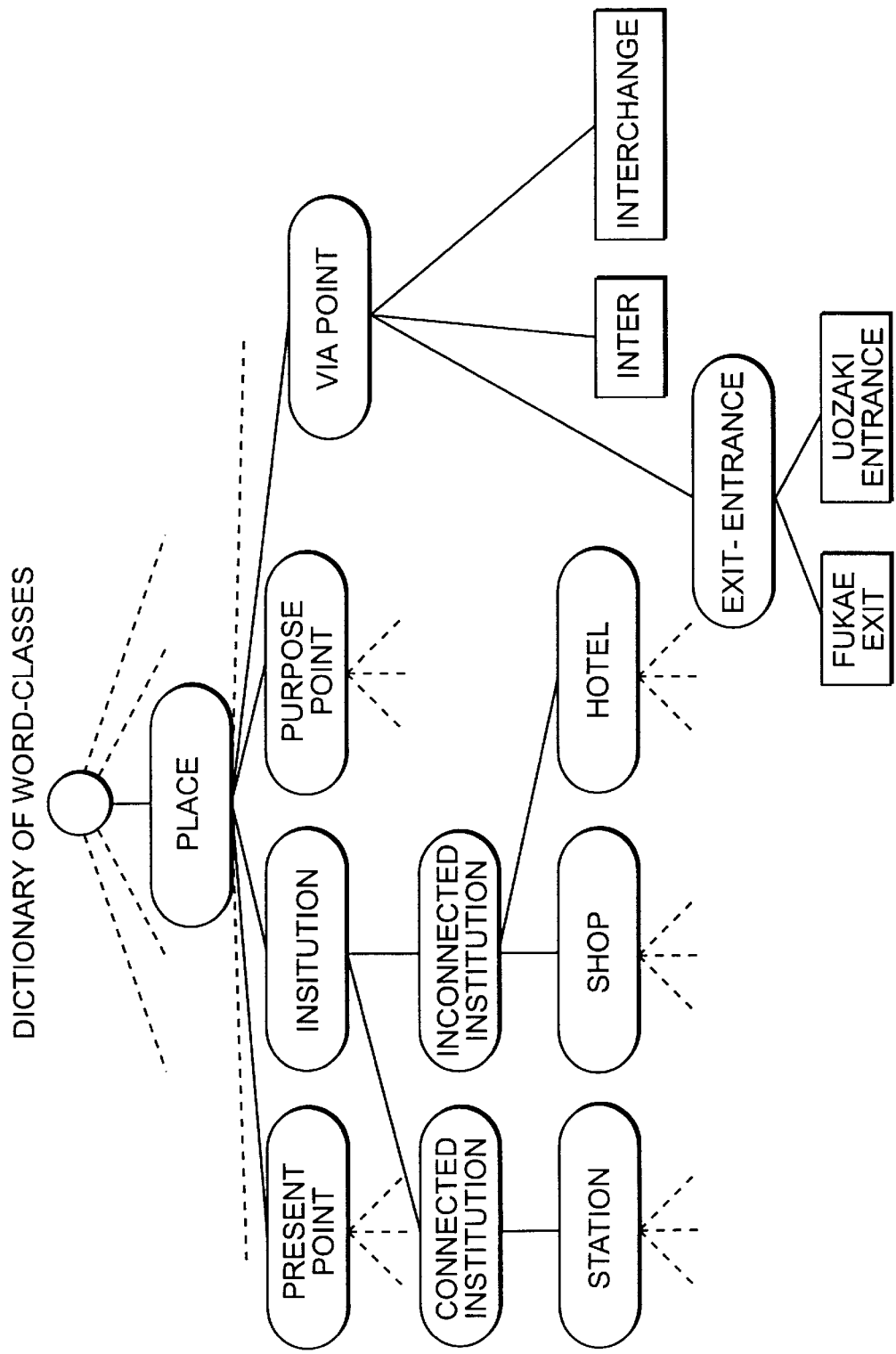
FIG. 9 is a schematic diagram of one example of a dictionary of word-classes in the first embodiment.

Hereafter, as for the speech signal of the input sentence, a concrete example of an adequate word sequence derived from the word-spotting result is explained. First, a dictionary and data component used for the information analysis process is explained with reference to dictionary of word-class, a dictionary of patterns of word-class sequences, a hash dictionary of word-class sequences, and a list of processing nodes. In case of generation of the dictionary of patterns of word-class sequences and the hash dictionary of word-class sequences, a dictionary of sentence types is referred to. These dictionaries are stored in the mass external storage unit 5. FIG. 9 shows one example of the dictionary of the word-class. In FIG. 9, the word-class is represented as a rectangular-circle and the word is represented as a rectangle. For example, the word-class "PLACE" includes sub-word-classes "PRESENT POINT", "INSTITUTION", "PURPOSE POINT", "VIA POINT". The word-class "VIA POINT" includes a sub-word-class "EXIT-ENTRANCE" and the words "INTER", "INTERCHANGE".

FIG. 10 shows the dictionary of sentence-types for defining an acceptable word sequence. In FIG. 10, two sentence-types g1 and g2 are registered. In the sentence-type, a smallest unit surrounded by "(" ")", for example, "(place)" and "(Via Point)", is a word-class corresponding to one word. The word-class sequence is connected by "-". For example, "one selection from A, B, C" is represented as "(A | B | C)". A unit surrounded by "[" "]" represents that the content in "[ ]" appears one time or zero times. For example, the following word sequences are generated from "g1".

"soko[there]" "made[to]""dorekurai[how long]"
"Kyoto" "made" "dorekurai"
"Suita" "made" "nan-pun[how many minutes]"
"iriguchi[entrance]""made" "donokurai"
The following word sequences are generated from "g2".
"Kurashiki" "nanika" "taberutokoro" "aru"
"Kyoto-eki-rotary" "nanika" "mejirushi" "aru"

The dictionary of sentence-types is expanded as the dictionary of patterns of word-class sequences as shown in FIG. 11. In FIG. 11, 18 patterns of word-class sequences from "sp01-g1" to "sp18-g1" are generated from the sentence-type g1, and 4 patterns of word-class sequences from "sp01-g2" to "sp04-g2" are generated from the sentence-type g2. A sign assigned to each pattern of word-class sequences such as "sp01-g1" is a word-class sequence ID. Each pattern of word-class sequence is represented as the connection of the word-class of one word. For example, the following acceptable word sequence is generated from "sp11-g1".

"Uozaki" "Inter" "nankiro[how long]"

According to the content of the dictionary of patterns of word-class sequences, a hash dictionary is generated by the appearance position (appearance order) of each word-class in each pattern of word-class sequence. FIG. 12 shows the hash dictionary of word-class sequences. For example, in word appearance number "1" of the hash dictionary shown in FIG. 12, as the pattern of the word-class sequence in which "place name" is positioned at the head position, "sp01-g2" and "sp02-g2" exist. The hash dictionary consists of a hash table organized by the word appearance number from first word in the sentense "1" to the last word in the sentence (in FIG. 12, "5") "end" in the word-class sequence.

Figure 6:
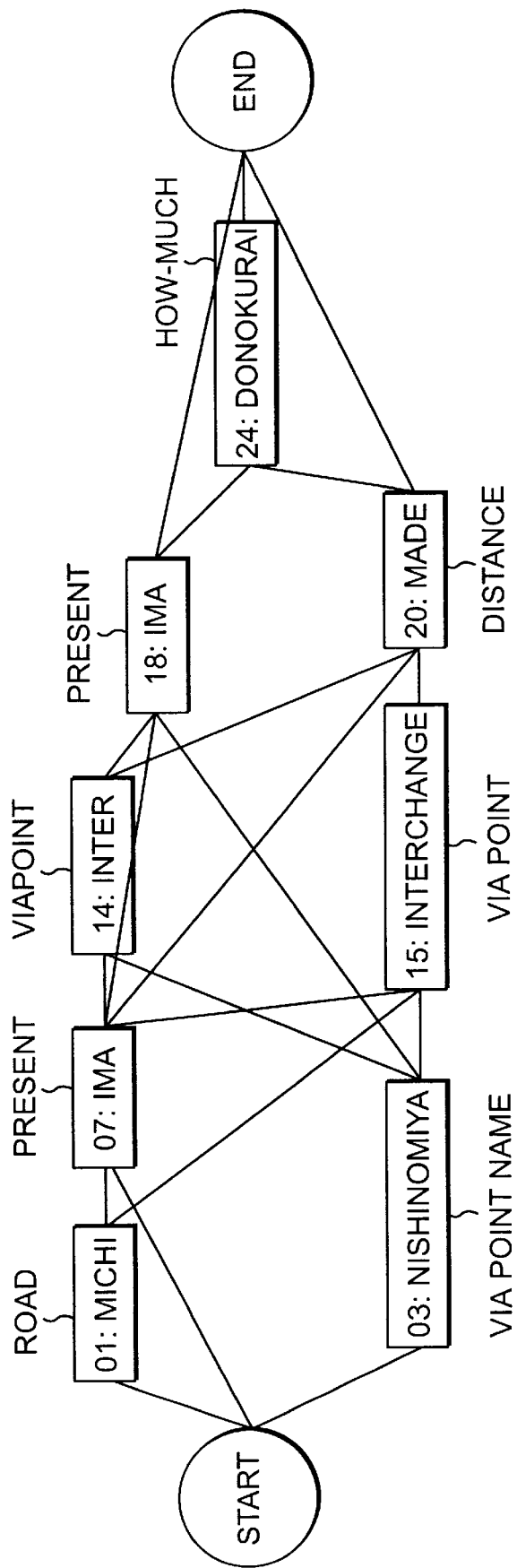
FIG. 6 is a schematic diagram of the word lattice obtained from the word-spotting result.

Assume that the word-spotting result is obtained from a speech input sentence, "Nishinomiya-interchange-made-donokurai [How long does it take to Nishinomiya interchange]" as shown in FIG. 5. From left to right on each line, FIG. 5 shows the estimated input word, the weight given to the estimated input word, and the time duration of the estimated input word measured from the start of the sentense. By using the time relation between word candidates and a restriction of overlap or separation, a lattice structure in which word candidates are linked in order is generated from the data in FIG. 5 as shown in FIG. 6.

In each node of the lattice structure, a data element as shown in FIG. 7 is stored. In FIG. 7, data elements are "NODE ID" "WORD-CLASS" "LIST OF ANTECEDENT NODES" "LIST OF NEXT NODES" "LIST OF UNPROCESSED ANTECEDENT NODES" "INTER PROCESSING LIST" "INPUT ELEMENT ID: WORD EXPRESSION". The first element of node is "NODE ID" which is written as input element ID: word expression". The second element is the word-class" of the word. The third element is "LIST OF ANTECEDENT NODES" representing a set of nodes connectable to a particular node in the lattice structure. The fourth element is "LIST OF NEXT NODES" representing a set of nodes connectable from the particular node in the lattice structure. The fifth element is "LIST OF UNPROCESSED ANTECEDENT NODES" representing a set of nodes whose analysis process is not completed in the list of antecedent nodes. The analysis process of the particular node is not executed until the content of the list of unprocessed antecedent nodes is empty. The sixth element is "INTER PROCESSING LIST" representing the ID of the pattern of word-class sequence of the particular node if the particular node is an acceptable word-class in the pattern of word-class sequence. The inter processing list consists of a position number in which the particular node appears in the acceptable word sequence and the ID of the pattern of the word-class sequence in which the particular node appears at the position number. For example, in FIG. 6, a node "07: ima" appears both at first position ("Ima" . . . ) and second position ("michi-ima") in the word sequence. In this case, the inter processing list separately stores the ID of patterns of word-class sequence in which this word ("ima") appears at the first position and the ID of patterns of word-class sequence in which this word ("ima") appears at second position.

Figure 3:
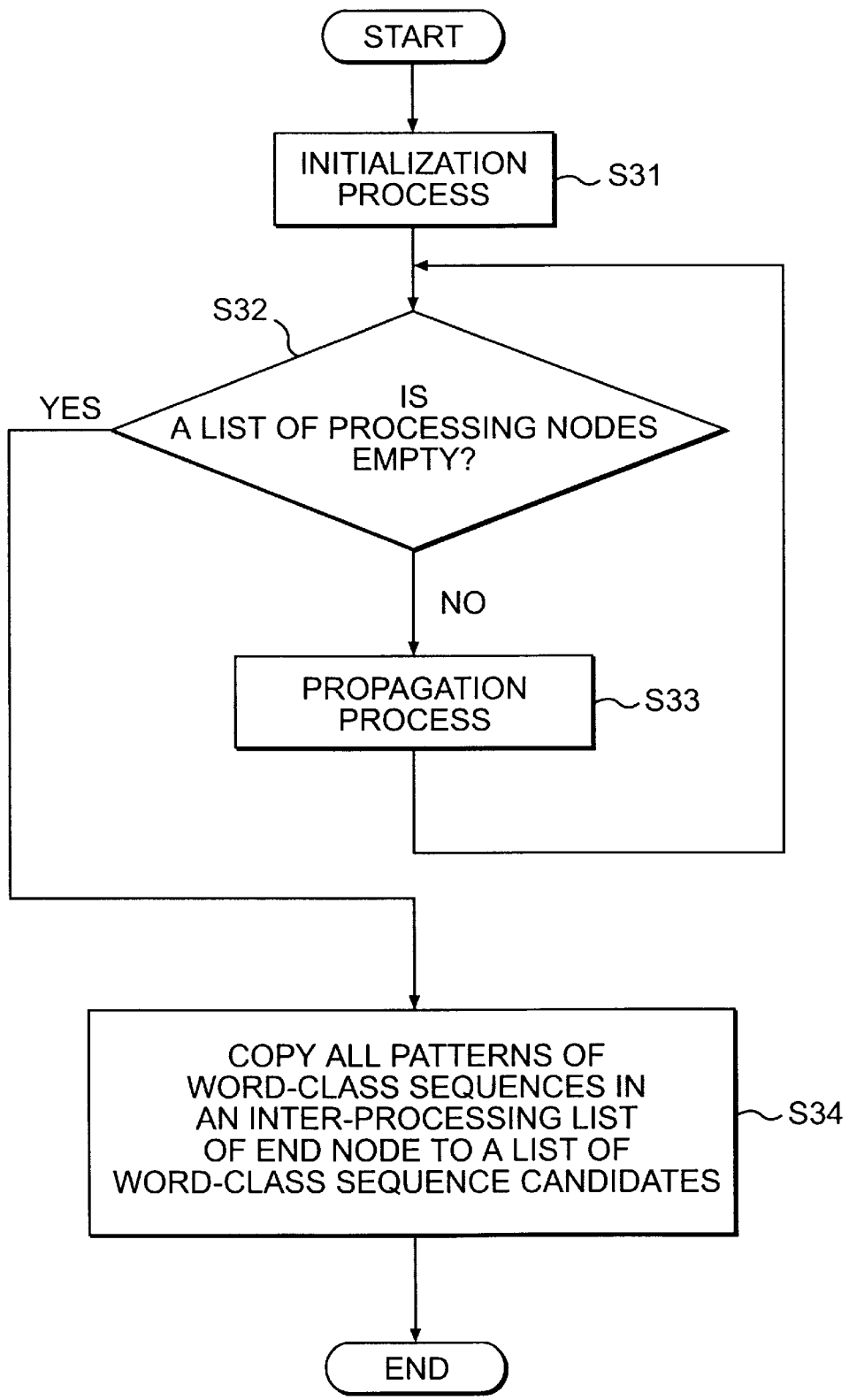
FIG. 3 is a flow chart of the generic processing of the lattice analysis according to the first embodiment of the present invention.
Figure 4:
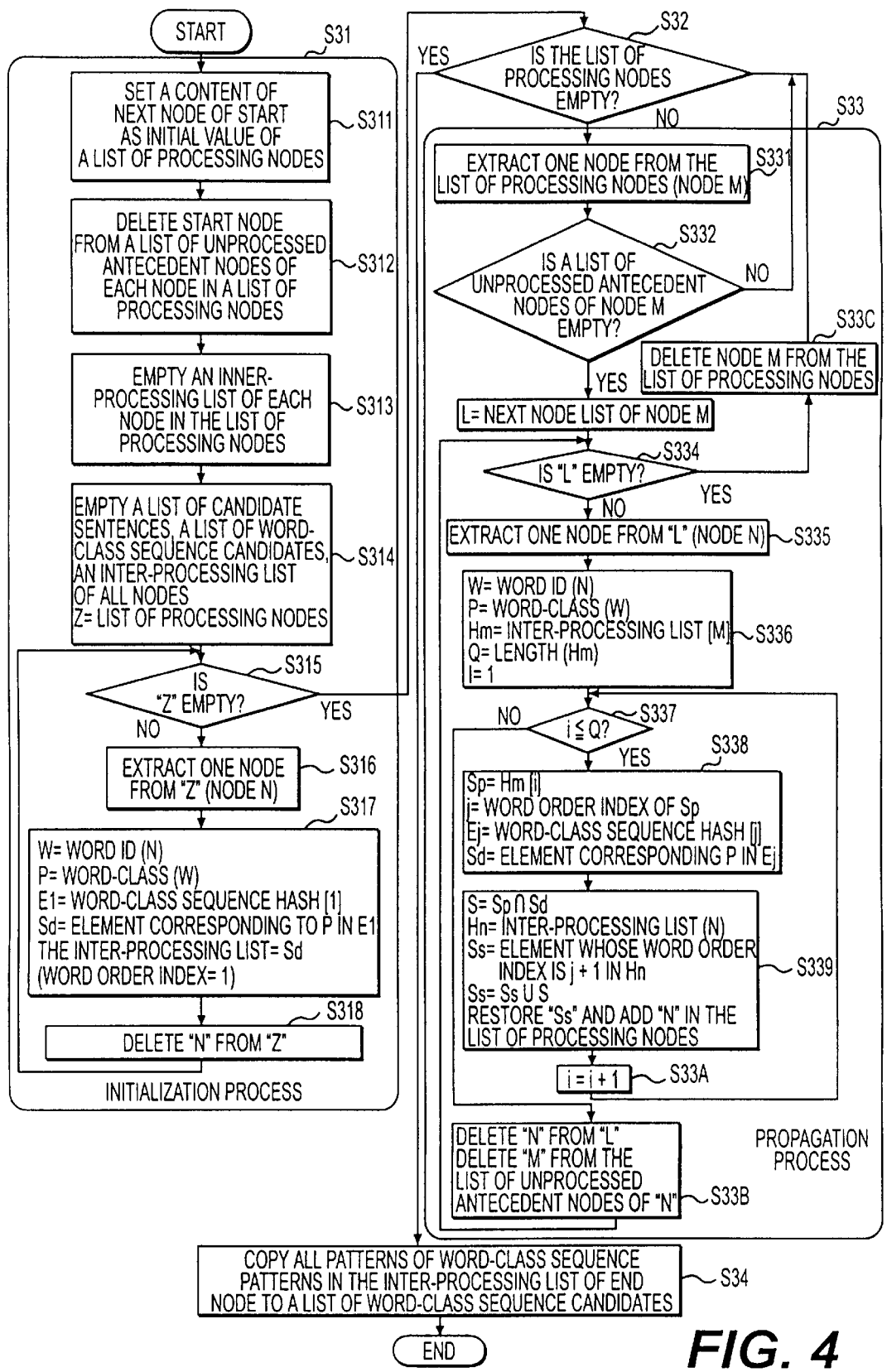
FIG. 4 is a flow chart of the detail processing of the lattice analysis according to the first embodiment of the present invention.

FIG. 3 is a generic flow chart of the lattice-analysis process in FIG. 2. FIG. 4 is a detailed flow chart of the lattice analysis process in FIG. 2. At the begining, preparation of the analysis process is executed as the initialization process (S31). Concretely speaking, the following four processes are executed.

(1) As for all nodes in the lattice structure, the content in the list of antecedent nodes is copied to the list of unprocessed antecedent nodes.

(2) The nodes directly connected from a start node in the lattice structure is written in a list of processing nodes.

(3) An initialization value of the nodes in the list of processing nodes is set.

(4) The start node is eliminated from the list of unprocessed antecedent nodes of each node in the list of the processing node.

In FIG. 6, the content of the list of processing nodes is represented as follows.

[07: ima, 01: michi, 03: nishinomiya]

The list of unprocessed antecedent node and the inter processing list of above three nodes is represented as follows.

| 07: ima | [01: michi] |
| | [(1: [])] |
| 01: michi | [] |
| | [] |
| 03: nishinomiya | [] |
| | [(1, [sp03-g2, sp04-g2, sp07-g1, sp08-g1, sp09-g1, sp10-g1, sp11-g1, sp12-g1])] |

When the initialization process (S31) is completed, the content of the node "14: inter" is shown in FIG. 8. After the initialization process (S31), the propagation process (S33) is repeated until the content of the list of processing nodes is empty (S32). The propagation process represents that if the content of the list of unprocessed antecedent nodes of a particular node is empty and the inter processing result of the particular node is determined, the content of the inter processing list of the particular node is propagated to the next node in the Ad lattice structure. When the content of the list of processing nodes is empty, the content in the inter processing list of an end node represents an acceptable word-class sequence in the lattice structure. Therefore, the ID of the acceptable word-class sequence in the inter processing list of the end node is copied to a list of the word-class sequence, and the lattice analysis process (S3) is completed. Next, the lattice structure is scanned by the list of the word-class sequence (S4) and a word sequence corresponding to the word-class sequence is extracted from the lattice structure as an acceptable word sequence.

Next, a concrete example of the propagation process (S33) is explained in detail. First, at step S331 in FIG. 4, one node is extracted from the list of processing nodes. In this case, "07: ima" is a node M to be processed. However, the list of unprocessed antecedent nodes of this node is not empty. Therefore, the process is not started upon check of step S332, but rather returned to step S32. At step S331 in FIG. 4, another node "01: michi", is extracted from the list of processing nodes. The list of unprocessed antecedent nodes of this node is empty, and the content of the inter processing list of this node is propagated to the next connected node "07: ima" and "15: interchange". In this case, the inter processing list of the node "01: michi" is empty. Therefore, the inter processing lists of next nodes "07: ima" and "15: interchange" are not changed and "01: michi" is eliminated from the lists of unprocessed antecedent nodes of the next nodes "07: ima" and "15: interchange". In short, the Us content of the list of unprocessed antecedent nodes and the inter processing list of these nodes are represented as follows.

| 07: ima | [] |
| | [(1, [])] |
| 15: interchange | [07: ima, 03: nishinomiya] |
| | [] |
| The list of processing nodes | |
| | [07: ima, 03: nishinomiya, 15: interchange] |

Next, at step S331, the node "07: ima" is extracted from the list of processing nodes. The list of unprocessed antecedent nodes of this node is empty and the propagation of this node is executed. However, the inter processing list of this node is empty. Therefore, the inter processing lists of four next nodes "14: inter, 18: ima, 20: made, 15: interchange" are not changed and "07: ima" is eliminated from the lists of unprocessed antecedent nodes of the four next nodes "14: inter, 18: ima, 20: made, 15: interchange". As a result, the content of the list of unprocessed antecedent nodes and the inter processing list of the four next nodes are represented as follows.

| 14: inter | [03: nishinomiya] |
| | [] |
| 15: interchange | [03: nishinomiya] |
| | [] |
| 18: ima | [03: nishinomiya, 14: inter] |
| | [] |
| 20: made | [14: inter, 15: interchange] |
| | [] |
| The list of processing nodes | |
| | [03: nishinomiya, 15: interchange, 14: inter, 18: ima, 20: made] |

Next, at step S331, a node "03: nishinomiya" is extracted from the list of processing nodes. The list of unprocessed antecedent nodes of this node is empty and the propagation from this node to next node is executed. First, the following list in which an order index of the inter processing list of the node "03: nishinomiya" is incremented by "1" is generated.

[(2, [sp03-g2, sp04-g2, sp07-g1, sp08-g1, sp09-g1, sp10-g1, sp11-g1, sp12-g1])]

A product set between the content of this list and the content of a corresponding word-class sequence hash of the next node is calculated. For example, in case of propagation to next node "14: inter", a following ID list corresponding to the word-class "Via Point" of the word "inter" in the appearance number "2" of the hash dictionary is extracted.

[sp08-g1, sp09-g1, sp10-g1, sp11-g1, sp12-g1, sp07-g1, sp03-g2, sp04-g2]

As a product result, the inter processing list of the node "14: inter" is represented as follows.

[(2, [sp03-g2, sp04-g2, sp07-g1, sp08-g1, sp09-g1, sp10-g1, sp11-g1, sp12-g1])]

The same propagation process is executed to each next node directly connected from the node "03: nishinomiya". The list of unprocessed antecedent nodes and the inter processing list of each next node is represented as follows.

| 14: inter | [] |
| | [(2, [sp03-g2, sp04-g2, sp07-g1, sp08-g1, sp09-g1, sp10-g1, sp11-g1, sp12-g1])] |
| 15: interchange | [] |
| | [(2, [sp03-g2, sp04-g2, sp07-g1, sp08-g1, sp09-g1, sp10-g1, sp11-g1, sp12-g1])] |
| 18: ima | [14: inter] |
| | [] |
| The list of processing nodes | |
| | [15: interchange, 14: inter, 18: ima, 20: made] |

Next, at the step S331, the node "15: interchange" is extracted from the list of processing nodes. The list of unprocessed antecedent nodes of this node is empty and the propagation of the inter processing list from this node to the next node is executed. First, the following list in which the order index of the interprocessing list of the node "15: interchange" is incremented by "1" is generated.

[(3, [sp03-g2, sp04-g2, sp07-g1, sp08-g1, sp09-g1, sp10-g1, sp11-g1, sp12-g1])]

A product set between the content of this list and the content of the corresponding word-class sequence hash of next node "20: made" is calculated. In short, the following ID list corresponding to the word-class DISTANCE" of the word "made" in the appearance number "3" of the hash dictionary is extracted.

[sp08-g1, sp10-g1, sp12-g1]

As a product result, the inter processing list of the node "20: made" is represented as follows.

[(3, [sp08-g1, sp10-g1, sp12-g1])]

The same propagation process from the node "14: inter" is executed. In this case, the propagation is executed to next node "18: ima". However, corresponding hash dictionary item of the next node "18: ima" does not exist. Therefore, the inter processing list of the node "18: ima" remains empty. As a result, the list of unprocessed antecedent nodes and the inter processing list of these nodes are represented as follows.

| 20: made | [] |
| | [(3, [sp08-g1, sp10-g1, sp12-g1])] |
| 18: ima | [] |
| | [] |
| The list of processing nodes | |
| | [18: ima, 20: made] |

Next, at the step S331, the node "18: ima" is extracted from the list of processing nodes. The list of unprocessed antecedent nodes of this node is empty and the propagation process of the inter processing list from this node "18: ima" to next nodes "24: donokurain "END" is executed. However, the content of the inter processing list of this node "18: ima"

is empty. Therefore, the inter processing lists of next nodes "24: donokurai" and "END" are not changed and the node "18: ima" is eliminated from the list of processing nodes. As a result, the list of unprocessed antecedent nodes and the inter processing list of the next nodes are represented as follows.

| 20: made | [] |
| | [(3, [sp08-g1, sp10-g1, sp12-g1])] |
| 24: donokurai | [20: made] |
| | [] |
| The list of processing nodes | |
| | [20: made, 24: donokurai] |

Next, at step S331, the node "20: made" is extracted from the list of processing nodes. The list of unprocessed antecedent nodes of this node is empty and the propagation process from this node "20: made" to next nodes "24: donokurai" "END" is executed. First, the following list which the order index of the interprocessing list of the node "20: made" is incremented by "1" is generated.

[(4, [sp08-g1, sp10-g1, sp12-g1])]

This list is propagated to next nodes "24: donokurai" and "END". In case of the next node "24: donokurai", the following ID list corresponding to the word-class "HOW-MUCH" of the word "donokurai" in the appearance number "4" of the hash dictionary is extracted.

[sp08-g1]

In case of propagation to "END" node, the hash dictionary item corresponding to the appearance number "end" is referred. However, as shown in FIG. 12, the sentence-type in which the word-class "distance" is the last word is not registered. Therefore, the inter processing list of "end" node is not updated. As a result, the list of unprocessed antecedent node and the inter processing list of the remained nodes and the list of processing nodes are represented as follows.

| 24: donokurai | [] |
| | [(4, [sp08-g1])] |
| END | [24: donokurai] |
| | [] |
| The list of processing nodes | |
| | [24: donokurai] |

Next, at step S331, the node "24: donokurai" is extracted from the list of processing nodes. The list of unprocessed antecedent nodes of this node is empty and the propagation of the inter processing list from this node 24: donokurai" to "END" node is executed. In this propagation, the hash dictionary item of the word appearance number "end" is referred. In this case, the item corresponding to the word-class "HOW MUCH <dorekurai>" is referred and a product between this item and the inter processing list of the node "24: donokurai" is calculated. As a result, the list of unprocessed antecedent nodes and the inter processing list of "END" node remains as follows.

| END | [] |
| | [(5, [sp08-g1])] |

In this case, the content of the list of processing nodes is empty and the content of word-class sequence is represented as follows.

[sp08-g1]

In this way, the lattice analysis process S3 is completed. Then, the forming process of word sequence candidate list is executed. As the forming process of the word sequence candidate list, a word sequence corresponding to the word-class sequence "sp08-g1" is extracted from the input lattice structure. In this case, during the lattice analysis process, a set of word-class sequence to which each node belongs remains in the inter processing list of the each node. Therefore, the nodes sequence, each of which "sp08-g1" is stored in the inter processing list, is searched from the lattice structure as the acceptable word sequence. As a result, the following acceptable word sequence is extracted.

"03: nishinomiya, 15: interchange, 20: made, 24: Hedonokurai"

As mentioned-above, in the information analysis method of the first embodiment, when the speech recognition result as the input lattice structure is analyzed, the acceptable word sequence matched with the sentence-type rule is quickly extracted using a small memory capacity.

The information analysis method in the first embodiment may be called a propagation of an acceptable pattern-sequence method. In this method, without expanding the lattice structure, by referring the hash dictionary consisting of the ID of an acceptable word-class sequence arranged by appearance position of each word-class, the content of the hash dictionary corresponding to the word-class and appearance position of the word is propagated to the next word in the lattice structure. A common ID of the word-class sequence between the propagated content and the retrieved content of the hash dictionary corresponding to the word-class and appearance position of the next word is further propagated. By propagation to the end node, an acceptable word-class sequence as the user's input sentence is selected. However, this information analysis method includes the following problems. First, in case a set of acceptable word-class increases, a large hash dictionary is necessary. Second, the cost of calculation is high because the scale of product calculation for the propagation process increases. Third, careful consideration is necessary for the sentence-type to generate the acceptable word-class sequence. For example, in case a task of the speech dialogue system is a car-navigation system, the number of words related with "place" increases. However, if a system manager mistakenly assigns the word-class sequence related with "place", the expression of "place" as an acceptable sentence-type is different. Users cannot understand the expression of "place" to be accepted and are confused. Furthermore, if the number of sentence-types is large and the expression of "place" is added or deleted, the process of management is complicated. As a result, the expression of "place" as an acceptable sentence-type is accidentaly different and users are also confused.

As mentioned-above, in the propagation method of an acceptable pattern sequence, if a set of word-class sequences increases, a scale of the hash dictionary increases and a large memory capacity is necessary. The large cost in calculation quantity is necessary because the scale of product calculation for the propagation process increases. Furthermore, the careful consideration is necessary for the sentence-type to generate the acceptable word-class sequence.

The second embodiment of the present invention copes with the above problems. In the second embodiment, even if the size of the set of word class sequences increases, increases in memory capacity and calculation quantity of the propagation process are suppressed. Furthermore, as for the dictionary of the acceptable pattern sequences to generate the word-class sequences, a format allowing the system manager to easily manage the system is supplied. The second embodiment is shown as a difinition method of the acceptable pattern sequence to easily manage/correct the dictionary of the acceptable word-class sequence in the propagation method of the acceptable pattern sequence. Furthermore, even if the number of patterns of word-class sequence increases, the increase of memory capacity cost of the calculation are suppressed. In this case, assume that the car navigation system of speech indication method is the task.

FIG. 15 shows an example of the dictionary of sentence-types used for the propagation method of an acceptable pattern sequence. In FIG. 15, characters surrounded by "(" and ")" represents the word-class, a sign "|" represents an output sign of one of two word-classes located on either side of "|", a sign "-" representing a division of one syntax element into a plurality of lines. Each syntax element is separated by a space or a line feed. For example, the sentence-type "Where" consists of two syntax elements and a first syntax element consists of five units. Therefore, five patterns of the word-class sequence are generated from the sentence-type "Where". In FIG. 15, three kinds of sentence types such as "Where" "How Much 1" "How Much 2" are registered. However, in this definition, an expression format is complicated. For example, the word-class sequences located before "WHERE" in the sentence-type "Where" is complicated as follows.

"(via Point name) (Via Point) | (institution name) (institution) | (Via Point) (relative order) (absolute order) (institution) | (Via Point) (relative order) (institution)l (Via Point name) (Via Point) (relative order) (institution)"

In this case, management of the correction and addition of this word-class sequences is complicated. Especially, in the sentence-type "How Much 2", this word-class sequences exists in a begining position and a position immediately after the word-class "starting point". Therefore, even if the word-class sequences of one position is corrected, the word-class sequences of the other position is not mistakenly corrected. Furthermore, in FIG. 15, a common expression representing "place" exists in each sentence-type.

FIG. 16 shows an example of the dictionary of sentence-types obtained by correction of the dictionary in FIG. 15 according to the second embodiment. This correction is expression of "place" is defined as one sentence-type of place phrase"". In FIG. 16, an identifier representing "difinition as the dictionary of one grammar set" is "+Phrase" and characters positioned after the identifier represent name of the dictionary. The grammar set represents either "a rule of partial syntax" or "a rule of all syntax". In case of using another sentence-type, an identifier representing the necessity of the other sentence-type is "−Needs" and characters positioned after the identifier represents the name of the dictionary. In FIG. 16, as for a dictionary of sentence-types of "all sequences", another dictionary of sentence-types "place phrase" is necessary. In case of a plurality of dictionaries of sentence-types, a plurality of names of the dictionaries are written after the identifier "−Needs". Therefore, in case of the addition of the expression of "place", if the dictionary of the sentence-type "place phrase" is corrected, this correction is reflected in the dictionary of sentence-type "all sequence". Therefore, the system manager can define the dictionary of the sentence-type to easily manage/correct. In this method, a set representing some meaning is managed as one dictionary, but a set including grammatical information such as the subject and the predicate may be managed as one dictionary.

Next, the lattice analysis method of the second embodiment is explained in detail. In the second embodiment, without expanding the dictionary of sentence-type in FIG. 16, the interpretation of lattice for each grammar set is executed in order. Accordingly, an increase of the number of patterns of word-class sequences i.e., an increase of resources such as memory capacity and calculation quantity and employment cost, are suppressed. First, a hierarchical hash dictionary shown in FIG. 18 is generated. FIG. 17 shows one example of the dictionary of patterns of hierarchical word-class sequences. As shown in FIG. 17, the hash dictionary for each grammar set may be generated from the dictionary of patterns of hierarchical word-class sequences. Otherwise, the hash dictionary previously generated may be read out. In FIG. 17, the example of the dictionary of sentence-types in FIG. 16 is expanded as the dictionary of patterns of hierarchical word-class sequences. The dictionary of patterns of hierarchical word-class sequences generates the word-class pattern from the dictionary of sentence-type of each grammar set. Strictly speaking, the grammar set (all sequences, place phrase) is not the word-class but is virtually regarded as the word-class. In FIG. 17, five patterns "P1#0"~"05#0" are defined for "place phrase" and three patterns "Where #0" "How Much 1 #0" "How Much 2 #0" are defined for "all sequences" by using "place phrase". In this case, "#0" in the ID of each word-class pattern is supplementally explained. The "#0" is an ID added to a pattern expanded from one sentence-type. In case a plurality of word-class patterns are expanded from one sentence-type, different IDs such as "#1" "#2" . . . are added. In FIG. 17, an identifier representing the definition as one grammar set is "+Phrase" and characters positioned after the identifier represents name of the grammar set. In case of using another grammar set, an identifier representing the necessity of the grammar set is "−Needs", and characters positioned after the identifier represents the necessary grammar set. A distinct ID is added to each word-class sequence and a sign written in the head of each sequence is the ID.

FIG. 18 shows one example of the hierarchical hash dictionary. This hash dictionary is generated from the dictionary of patterns of hierarchical word-class sequences in FIG. 17. In FIG. 18, as for the word-class whose appearance position is "1" in "Place Phrase", three kinds of word-classes "Via Point name" "institution name" "Via Point" exist. As for the word-class pattern ID, the word-class "Via Point name" is "P1#0" and "P5#0"; the word-class "institution name" is "P2#0"; and the word-class "Via Point" is "P3#0", "P4#0". As for the word-class whose appearance position is "1" in "all sequences", "place phrase" only exist. As shown in FIG. 18, the hierarchical hash dictionary is generated from the dictionary of patterns of hierarchical word-class sequences expanded by unit of grammar set.

Figure 14:
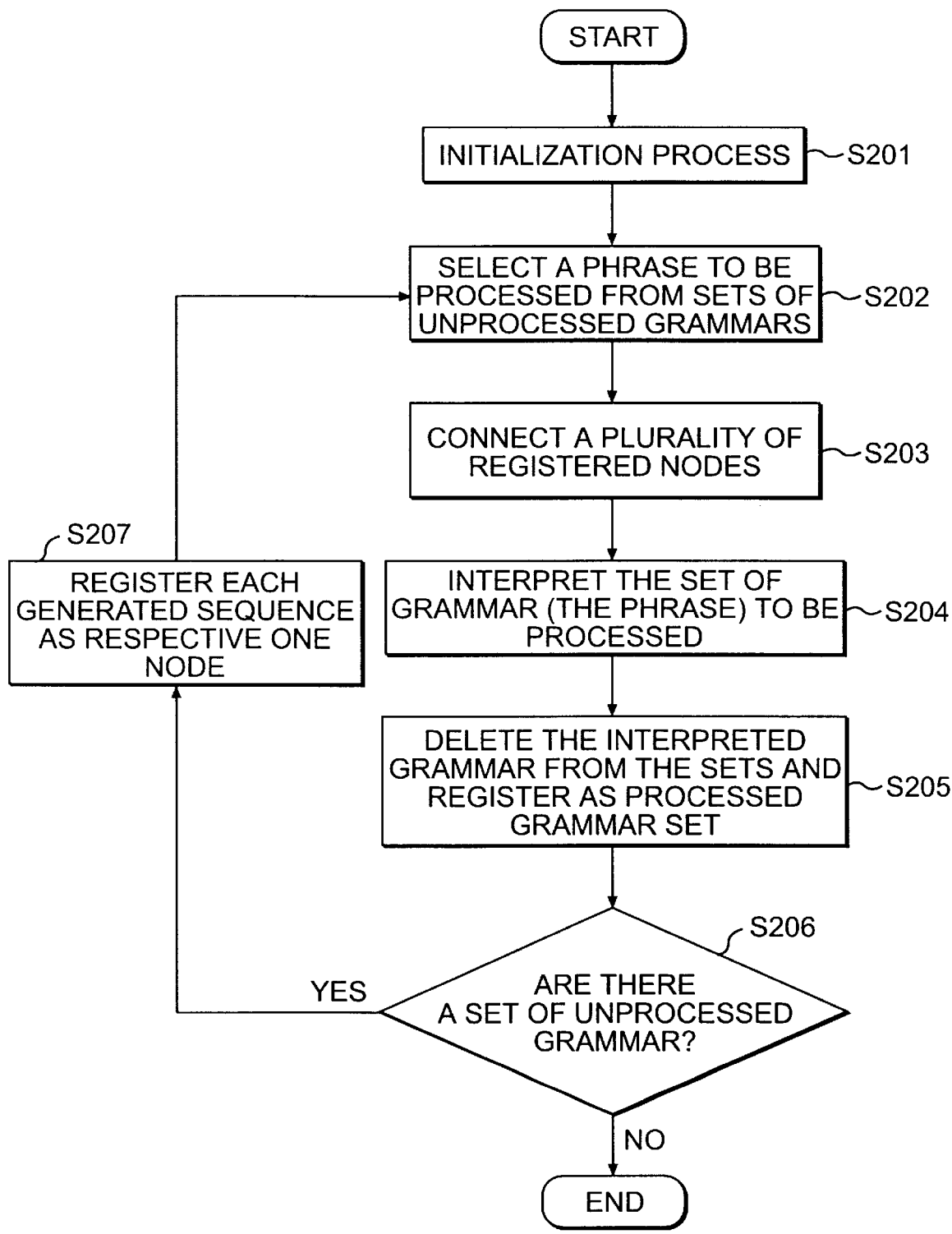
FIG. 14 is a flow chart of processing of the information analysis method according to a second embodiment of the present invention.

FIG. 14 is a flow chart of the lattice analysis method according to the second embodiment. For example, in case the recognition result of the lattice structure is supplied from the input section 3 in FIG. 1, CPU 1 executes the lattice analysis process according to the flow chart in FIG. 14.

[S201] In this step, initialization of the lattice interpretation process is executed. In the initialization process, a list to record a processed grammar set name and an unprocessed grammar set name is prepared. First, all grammar set names are registered in the list of unprocessed grammar set name. Furthermore, a list to record each node is prepared as a node list. Each unit in the lattice structure (each word in the word-lattice) is registered as the node in the node list. In this node, except for each recognition unit, a set of IDs of word-class patterns by unit of appearance position and the word-class information (name of grammar set) are included. In this case, corresponding word-class information is registered in this node.

[S202] The grammar set applied for the lattice interpretation is selected. In order to select the grammar set, it is confirmed whether another grammar set necessary for generation of the grammar set is already generated because the sequence corresponding to the grammar set is not often generated if the grammar set is interpreted while the other necessary grammar set is not generated. In order to confirm the above condition, the grammar set name after the identifier "–Needs" is referred. In short, a necessary grammar set name after the identifier "–Needs" is compared with the processed grammar set names. If all of the necessary grammar set name is included in the processed grammar set names, the grammar set is applicable. Therefore, as for a grammar set applicable first, the necessary grammar set after the identifier "Needs" does not exist. Furthermore, in order to finally apply the grammar set of "all sequences", the dependence relation must be written in the identifier "–Needs".

[S203] In this step, registered nodes are properly connected. Each node is connected according to the appearance position of the word. For example, in case of speech lattice, the decision of connection between two words is executed by overlap or separation of the appearance frame of the word. Furthermore, a list of hierarchical connectable word-class shown in FIG. 19 may be referred in order to reduce useless connection. However, if a grammar set except for the final grammar set of "all sequences" is selected at S202, the grammar set appears in an arbitrary position in the sentence. Therefore, a condition related with sentence head/end is not applied.

FIG. 19 shows are example of the list of hierarchical connectable word-classes. In the list of hierarchical connectable word-classes, connection between two neighboring word-classes (two grammar set names) extracted from the dictionary of sentence-types is stored. In case of extraction from the dictionary of sentence-types of two levels in FIG. 16, the list of hierarchical connectable word-classes is respectively generated from each grammar set of two levels. In FIG. 19, the list of hierarchical connectable word-classes generated from the dictionary in FIG. 17 is shown. In the same way as FIG. 18, an identifier representing the definition as one grammar set is "+Phrase" and characters positioned after the identifier represents a name of the grammar set. In case of using another grammar set, an identifier representing the necessity of the other grammar set is "–Needs", and characters positioned after the identifier represent a name of the other grammar set. As shown in FIG. 19, in case of "place phrase", the word-class "Via Point" is connectable to the word-class "Via Point name". In case of "all sequences", the word-classes "WHERE" "distance" "starting point" are connectable to the word-class "place phrase".

[S204] As for the grammar set applied, the nodes connected are interpreted by using the propagation method of acceptable pattern sequences. In this case, the hash dictionary corresponding to the applied grammar set is referred from the hierarchical hash dictionary. Furthermore, a node related with the applied grammar set is often newly generated in the word-lattice. Therefore, except for the word-class dictionary set at initialization, the grammar set name registered in the list of processed grammar set is necessary to be referred. Alternatively, if the processed grammar set can be dynamically registered as the word-class, the processed grammar set name may be registered in the word-class dictionary as the word-class. In this case, the list of the processed grammar set name is not referred.

[S205] The grammar set name processed at S204 is deleted from the list of unprocessed grammar set names and registered in the list of processed grammar set names. If the processed grammar set is dynamically registered as the word-class, the grammar set name may be registered in the word-class dictionary.

[S206] It is decided whether all grammar sets (including "all sequences") are processed. In short, it is decided whether the list of unprocessed grammar set names is empty. If empty, the processing is completed. If not empty, the processing is forwarded to S207.

[S207] The sequence generated at S204 is registered as the node. In this case, in order to refer in case of next processing at S204, information representing the grammar set to which the generated node belongs is added to each node. For example, if the processed grammar set is dynamically registered as the word-class, the grammar set name may be added to the node as the word-class. Alternatively, while the grammar set name is added to the node, in case of processing of S204, it may be decided that the node corresponds to the grammar set from the list of processed grammar set names. As a final interpretation result, if a combination of word sequence information and the word-class pattern information is necessary, the word-class pattern is necessary to be added to each node.

Next, a concrete example of the lattice analysis method is explained. In this case, assume that the user speaks "Nishinomiya-inter-mae-servicearea-made-dorekurai?" to a speech recognition system to output the recognition result as the word-lattice format. A lattice interpretation system to which the lattice interpretation method of the second embodiment is loaded is connected to the speech recognition system and receives the recognition result. Furthermore, this lattice interpretation system is set to receive the dictionary of sentence-types in FIG. 16. In this case, the dictionary of patterns of hierarchical word-class sequences in FIG. 17 is generated from the dictionary of sentence-types in FIG. 16 and the hierarchical hash dictionary in FIG. 18 is generated from the dictionary of patterns of hierarchical word-class sequences in FIG. 17.

[S201] Assume that the word-lattice of the recognition result in FIG. 20 is received. In FIG. 20, a number surrounded by "<" and ">" represents appearance position of the word. When the word-lattice as word-spotting result is received, each node is registered in the node list by referring to the word-lattice. In the second embodiment, a corresponding word-class is registered to each node. Furthermore, a list of unprocessed grammar set names and a list of processed grammar set names are prepared. The grammar set name registered is extracted from the hierarchical hash dictionary and registered in the list of unprocessed grammar set names. As a result, content of the node list is shown in FIG. 21, and contents of the list of unprocessed grammar set names and the list of processed grammar set names are represented as follows.

(unprocessed grammar set name) . . . "place phrase", "all sequences"

(processed grammar set name)

[S202] Next, the grammar set to be applied first is selected. A list of the grammar set name necessary for each grammar set is generated as follows.

(place phrase)

(all sequence) . . . "place phrase"

This list is compared with the list of processed grammar set names, and the place phrase whose necessary grammar set is empty is selected as an applied grammar set.

Figure 22:
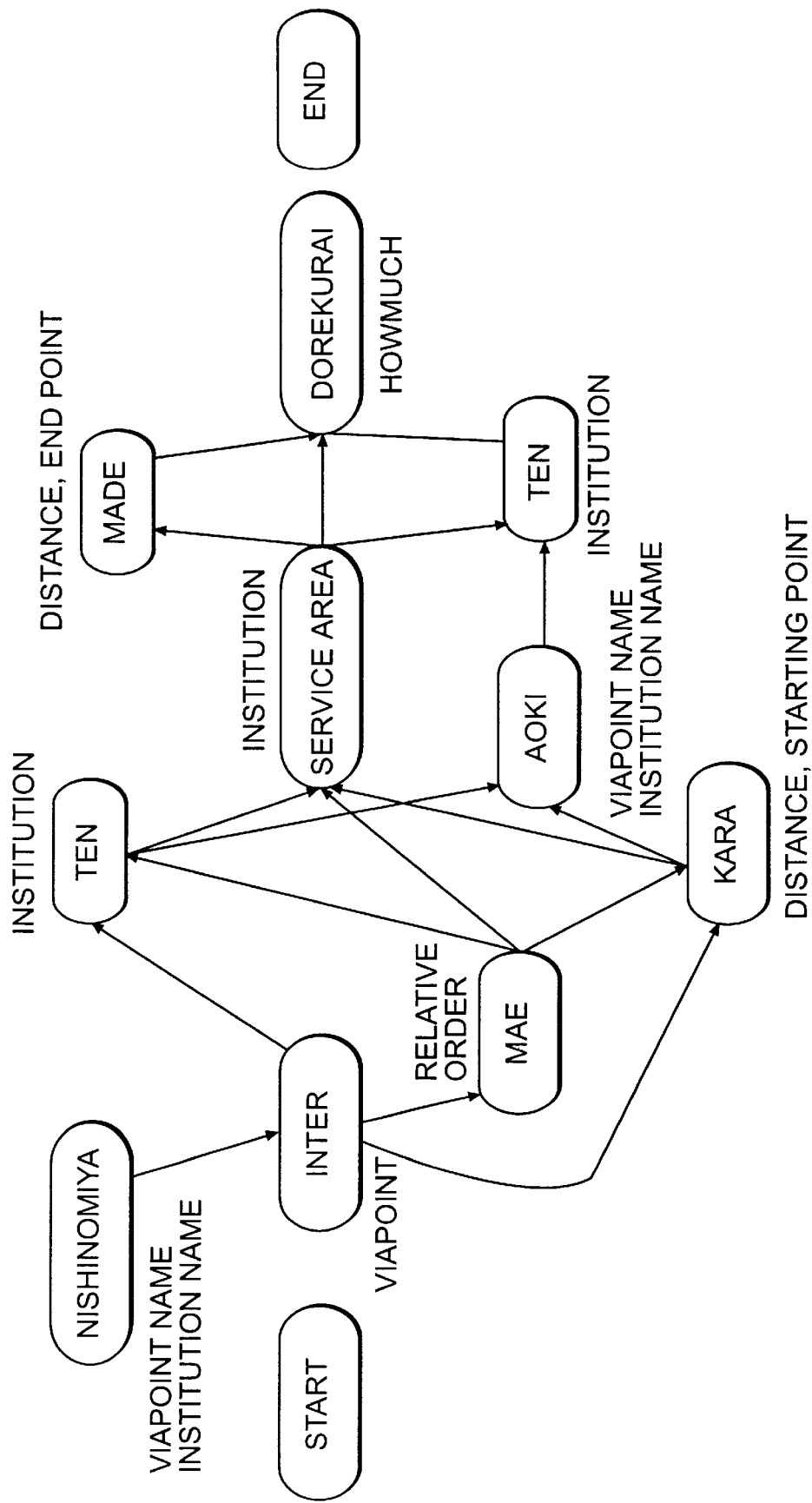
FIG. 22 is a schematic diagram of a word-lattice in the case of selection of a place phrase in the second embodiment.

[S203] Next, each node registered in the node list is connected based on the appearance position. In this case, the grammar set of "all sequences" except for "place phrase" to be applied at present is remained. Therefore, the grammar set of "place phrase" is not regarded as the final processing grammar set. As for a start node and an end node, all nodes are regarded as connected. As a result, the lattice structure shown in FIG. 22 is generated. In FIG. 22, "start" represents a sentence head, "End" represents a sentence end, characters surrounded by a circle represents the node, characters added to the node represents the word-class. In order to make clear FIG. 22, connections between each node and "start" "End" are omitted.

[S204] As for the lattice structure in FIG. 22, the propagation method of acceptable pattern sequences is executed by referring to the "place phrase" of the hierarchical hash dictionary in FIG. 18. As a result, the generated place phrases are shown in FIG. 23. In FIG. 23, a word connected by "-" represents each node, and characters surrounded by "(" ")" represents the word-class.

[S205] When the processing of place phrase is completed, the list of processed grammar set names and the list of unprocessed grammar set names are updated. The grammar set name "place phrase" is eliminated from the list of unprocessed grammar set names and registered in the list of processed grammar set names. As a result, the content of each list is represented as follows.

(unprocessed grammar set name) . . . "all sequences"
(processed grammar set name) . . . "place phrase"

[S207] The sequence generated at S204 is added to the node list as one node. In this case, this new node is registered as the node of the place phrase. As a result, the node list is updated as shown in FIG. 24.

[S202] As for "all sequences" remaining on the list of unprocessed grammar set names, a possibility of execution is checked. In this case, interpretation for "all sequences" is possible because the grammar set of "place phrase", which is necessary for generation of "all sequences", is already generated. Therefore, the grammar set of "all sequences" is selected as applicable grammar set.

Figure 25:
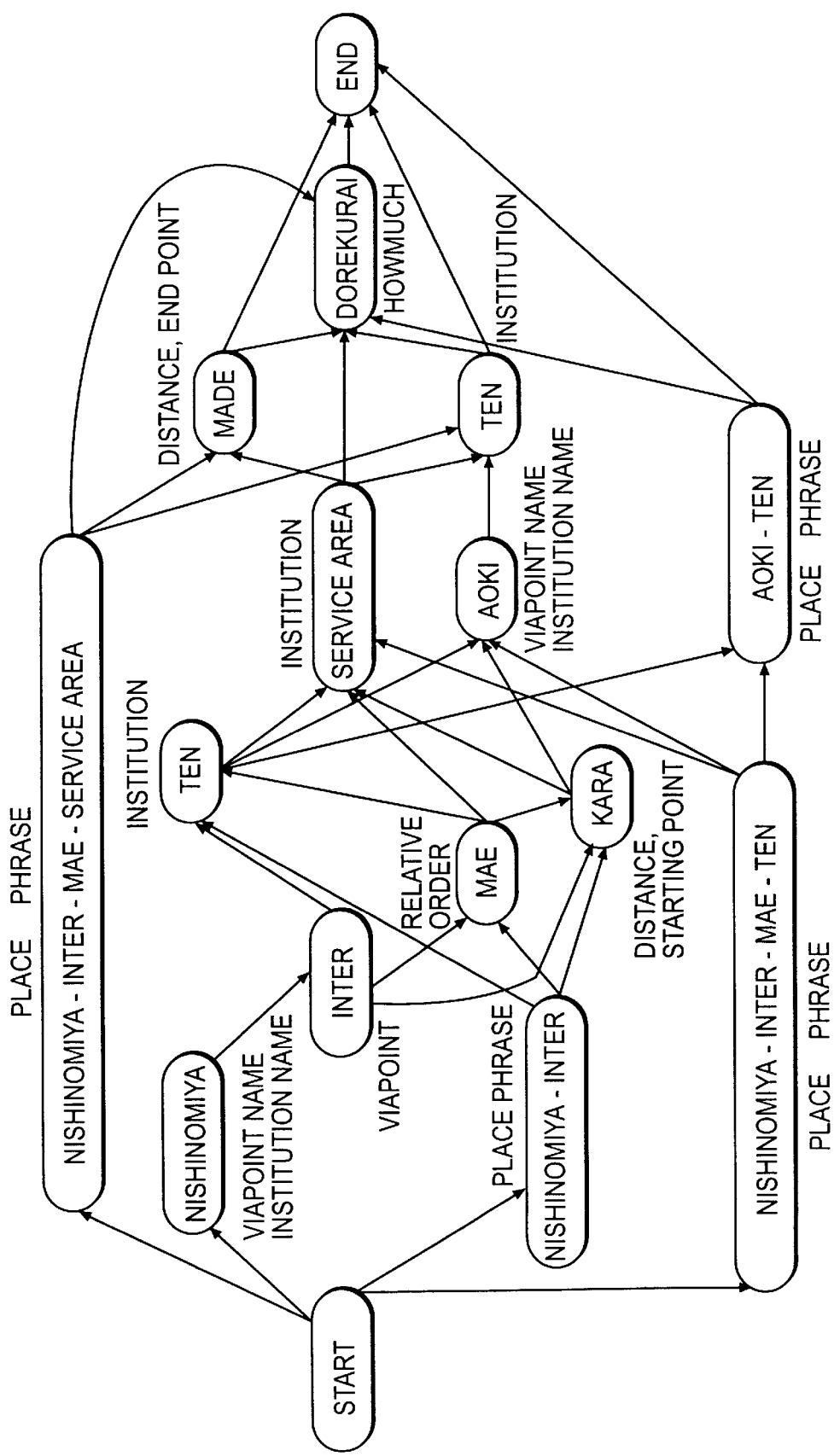
FIG. 25 is a schematic diagram of the word-lattice in the case of selection of all sequences in the second embodiment.

[S203] Each node registered in the node list of FIG. 24 is connected based on the appearance position. In this case, "all sequence" is the only grammar set remaining in the list of unprocessed grammar set name. Therefore, the decision of the sentence head and the sentence end is executed. As a result, the nodes in the lattice structure are connected as shown in FIG. 25. In FIG. 25, "Start" represents the sentence head, "End" represents the sentenc end, characters surrounded by a circle represents the node, and characters added to the node represents the word-class. In this case, the connection between the node and "Start" "End" is shown because the decision of connection for the sentence head and the sentence end is executed.

[S204] As for the lattice structure in FIG. 25, the propagation method of acceptable pattern sequences is executed by referring to the "all sequences" of the hierarchical hash dictionary in FIG. 18. As a result, a generated all sequence is shown in FIG. 26.

[S205] When processing of the all sequences is completed, the list of processed grammar set names and the list of unprocessed grammar set names are updated. The grammar set name "all sequences" is eliminated from the list of unprocessed grammar set names and registered in the list of processed grammar set names. As a result, the content of each list is represented as follows.

(unprocessed grammar set name)
(processed grammar set name) . . . "place phrase", "all sequences"

[S206] The processing is completed because the content of the list of unprocessed grammar set names is empty. The word-class sequence generated at this step is regarded as a lattice interpretation result.

In this way, the interpretation in the lattice structure is completed. As a final interpretation result, the following word sequence is obtained.

"Nishinomiya-inter-mae-servicearea-made-dorekurai"

The calculation quantity of the above-mentioned case is compared with the calculation quantity of non-hierarchization of the hash dictionary. In case of non-hierarchization, the content of the dictionary of patterns of word-class sequences is expanded as shown in FIG. 27. A part of appearance position "1" in the hash dictionary generated from the dictionary of patterns of word-class sequences is shown in FIG. 28. In this hash dictionary, a maximum of the appearance position is "10" and a maximum of the number of the word-class for each appearance position is "9". In short, the scale of the hash dictionary is large. Furthermore, in the propagation method of an acceptable pattern sequence, a set calculation of "And/Or" logic between elements in the hash dictionary is executed in order to restrict the patterns of word-class sequences. In this case, times of comparison in the set calculation are represented as the order of the square of the number of elements. In FIG. 28, a maximum of the number of elements in the hash dictionary is "14". In FIG. 18, a maximum of the number of elements in the hash dictionary is "3". In short, the numbers of elements of both cases are largely different.

In both cases of non-hierarchization and hierarchization of the hash dictionary, the order of times of the comparison operation is represented as follows.

non-hierarchization: $A_1^2 \times L$ hierarchization: $A_2^2 \times L \times R$ $A_1, A_2$ . . . maximum of the number of elements in the hash dictionary L . . . the number of connection between nodes connected at S3

R . . . times of execution of the propagation method in hierarchization

The times of comparison operation in the example of the second embodiment is calculated as follows.

non-hierarchization: 14×14×L=196L ($A_1$=14)

hierarchization: 3×3×L×2=18L ($A_2$=3)

Apparently, the times of comparison operation is greatly reduced by the hierarchization. As for the memory quantity in the computer used for the calculation, while hi; the number of patterns of word-class sequences to be memorized is "35" in case of non-hierarchization, it is "8" ((place phrase) "5"+(all sequences) "3") in the case of hierarchization. In short, the memory capacity is also greatly reduced and the scale of the hash dictionary is minituarized in proportion to the memory capacity.

Furthermore, in case of an increase of the number of the grammar set, the effect of the second embodiment increases. For example, in the above-mentioned example, assume that the number of word-class pattern of "place phrase" is "100". In case of non-hierarchization, the number of word-class patterns is "10200". In case of hierarchization, it is "103" ((place phrase) "100"+(all sequences) "3"). In short, the difference between both cases is meaningful.

Figure 29:
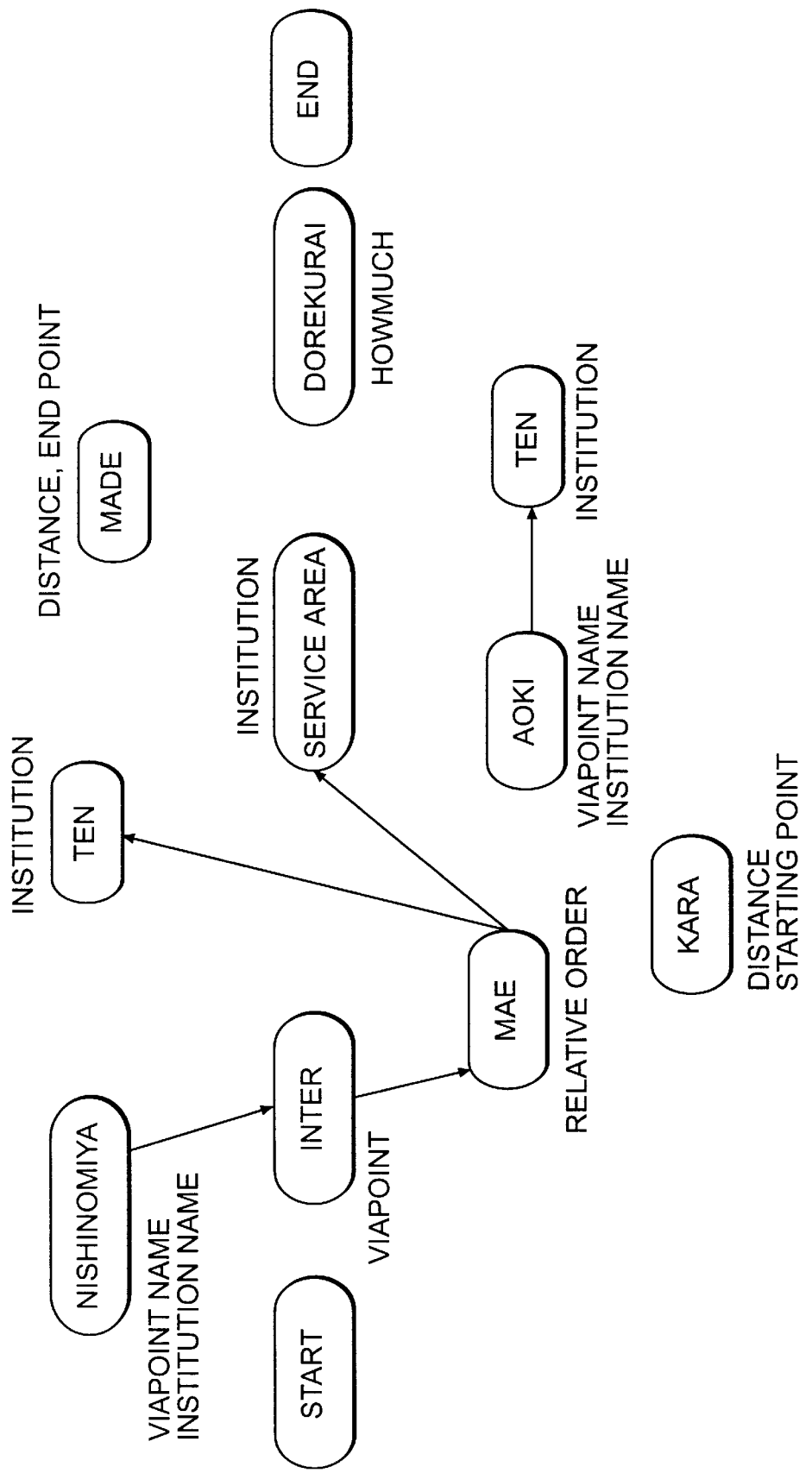
FIG. 29 is a schematic diagram of one example of the word-lattice connected by referring the connectable word-class list in the case of selection of the place phrase.
Figure 30:
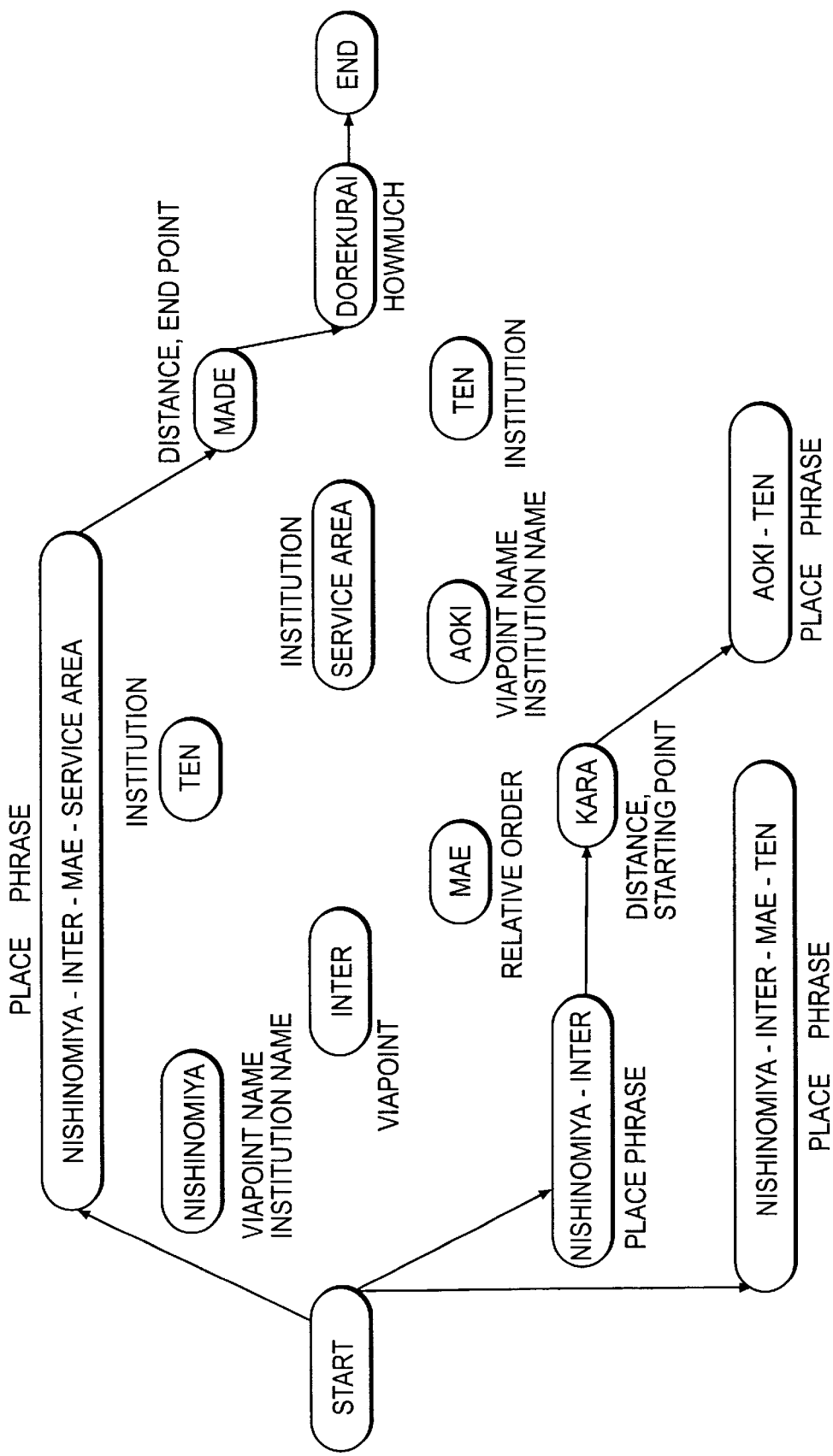
FIG. 30 is a schematic diagram of one example of the word-lattice connected by referring the connectable word-class list in case of selection of the all sequences.

In the second embodiment, assume that the list of hierarchical connectable word-class in FIG. 19 is applied at S203. FIG. 29 shows the nodes connected in case the place phrase is used as the grammar set, and FIG. 30 shows the nodes connected in case the all sequences is used as the grammar set after the node of the place phrase is generated. As shown in FIGS. 29 and 30, in comparison with the case of non-use of the list of hierarchical connectable word-class, the number of links between nodes and the calculation quantity in the propagation method are greatly reduced. Of course, even if the hierarchization of the hash dictionary is not executed, the number of links is reduced. However; if the hierarchization is executed, the scale of each grammar set is miniturized and the number of word-classes in the grammar set is reduced. As a result, the kinds of connection between nodes is reduced and the effect of the list of hierarchical connectable word-class increases. In short, the calculation quantity and the memory capacity in the propagation method of acceptable pattern sequence are greatly reduced.

As mentioned-above, in the second embodiment, even if the number of acceptable word-class sequences increases, the necessary memory capacity is suppressed. Furthermore, the scale of the set operation in the propagation process is miniturized. Therefore, the necessary cost for the calculation quantity is also suppressed.

In the second embodiment, the dictionary of sentence-types consists as one level of "place phrase-all sequences". However, as for as a relation of dependency is represented, the dictionary may be divided into a plurality of levels or other phrase may be defined as same position of the place phrase. Furthermore, if a dictionary of patterns of the word-class sequences to finally define a partial sequence is generated from the dictionary of sentence-types, any definition method of sentence-types may be used. For example, if the sentence-type is defined by a rewriting rule and the number of word-classes in the sentence-type is within a number of units of finite expansion as a premise of the propagation method, a pattern of word-class sequences expanded to a predetermined non-end sign is defined as the phrase, and the information analysis method of the second embodiment is applicable.

A memory device, including a CD-ROM, floppy disk, hard disk, magnetic tape, or semiconductor memory can be used to store instructions for causing a processor or computer to perform the process described above.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An information analysis apparatus, which connects after a speech recognizer for recognizing a user's speech input sentence and for generating a word-lattice linking a plurality of words from a start node to an end node as recognition candidates of the speech input sentence, for accepting the word-lattice as input and for generating a set of acceptable word sequences by referring to a word-class dictionary that matches each word to corresponding word-class and to a grammar that matches each word-class sequence to corresponding sentence type, comprising:

a hash dictionary means for storing a plurality of identifiers of word-class sequences each of which represents a sentence by unit of the word-class and word appearance number, the word-class being positioned at the word appearance number in the word-class sequence;

an initialization means for forming a node for each word in the word-lattice, the node including the word-class, an interprocessing list, lists of next nodes and unprocessed antecedent nodes in the word-lattice, the interprocessing list of the node directly linked from the start node represents the identifiers of word-class sequences for corresponding word-class and the word appearance number "1" in said hash dictionary means, and for forming a list of processing nodes representing the nodes directly linked from the start node;

a propagation means for extracting one node from the list of processing nodes if the list of unprocessed antecedent nodes of the one node is empty, for extracting each next node of the one node from the list of next nodes if the list of next nodes is not empty, for retrieving the identifiers of word-class sequences from said hash dictionary means by the word appearance number as link order and the word-class of the each next node, for respectively calculating a product of retrieved identifiers of the each next node and the identifiers in the interprocessing list of the one node, for storing the product as propagated identifiers in the interprocessing list of the each next node, for deleting the one node from the list of unprocessed antecedent nodes of the each next node and from the list of processing nodes, and for adding the each next node in the list of processing nodes;

repeat means for repeating process of said propagation means untill the list of processing nodes is empty; and word sequence extraction means for extracting the propagated identifiers of the end node if the list of processing nodes is empty, and for extracting word sequences corresponding to the word-class sequences of the propagated identifiers from the word-lattice.

2. The information analysis apparatus according to claim 1, wherein said hash dictionary means derives from the grammar that stores a representative of the word-class sequence by unit of acceptable sentence-type.

3. The information analysis apparatus according to claim 2, wherein the representative of the word-class sequence is expanded to a plurality of word-class sequences by unit of acceptable sentence-type as patterns of word-class sequences.

4. The information analysis apparatus according to claim 3, wherein the identifier of the pattern of the word-class sequence is stored by unit of the word-class and the word appearance number in said hash dictionary means if the word-class is positioned at the word appearance number in the pattern of word-class sequence.

5. The information analysis apparatus according to claim 1, wherein the node further includes a word identifier as the recognition candidate and a list of antecedent nodes, and wherein the list of antecedent nodes represents the word identifier which directly links to a particular node in the word-lattice, and the list of next nodes represents the word identifiers which directly links from the particular node in the word-lattice.

6. The information analysis apparatus according to claim 5, wherein said initialization means copies the list of antecedent nodes to the list of unprocessed antecedent nodes for each node at initialization mode.

7. The information analysis apparatus according to claim 6,
wherein the interprocessing list of each node except for the node directly linked from the start node is empty at the initialization mode.

8. The information analysis apparatus according to claim 1,
wherein the link order is a number of words from the start node to the next node in the word-lattice and is used as the word appearance number to retrieve the identifiers of word-class sequences from said hash dictionary means.

9. The information analysis apparatus according to claim 1,
wherein said propagation means calculates the product as common identifier included in both the retrieved identifiers of the next node and the identifiers in the interprocessing list of the one node.

10. An information analysis method, as a post-processing of a speech recognizer for recognizing a user's speech input sentence and for generating a word-lattice linking a plurality of words from a start node to an end node as recognition candidates of the speech input sentence, for accepting the word-lattice as input and for generating a set of acceptable word sequences by referring to a word-class dictionary that matches each word to corresponding word-class and to a grammar that matches each word-class sequence to corresponding sentence type, comprising the steps of:

storing a plurality of identifiers of word-class sequences each of which represents a sentence by unit of the word-class and word appearance number in a hash dictionary, the word-class being positioned of the word appearance number in the word-class sequence;

forming a node for each word in the word-lattice, the node including the word-class, an interprocessing list, lists of next nodes and unprocessed antecedent nodes in the word-lattice, the interprocessing list of the node directly linked from the start node represents the identifiers of word-class sequences for corresponding word-class and the word appearance number "1" in said hash dictionary;

forming a list of processing nodes representing the nodes directly from the start node;

extracting one node from the list of processing nodes if the list of unprocessed antecedent nodes of the one node is empty;

extracting each next node of the one node from the list of next nodes if the list of next nodes is not empty;

retrieving the identifiers of word-class sequences from said hash dictionary by the word appearance number as link order and the word-class of the each next node;

respectively calculating a product of retrieved identifiers of the each next node and the identifiers in the interprocessing list of the one node;

storing the product as propagated identifiers in the interprocessing list of the each next node;

deleting the one node from the list of unprocessed antecedent nodes of the each next node and from the list of processing nodes;

adding the each next node in the list of processing nodes, repeating the one node-extracting step, each next node-extracting step, retrieving step, calculating step, storing step, deleting step and adding step untill the list of processing nodes is empty;

extracting the propagated identifiers of the end node if the list of processing nodes is empty; and extracting word sequences corresponding to the word-class sequences of the propagated identifiers from the word-lattice.

11. A computer-readable memory, as a post-processing of a speech recognizer for recognizing a user's speech input sentence and for generating a word-lattice linking a plurality of words from a start node to an end node as recognition candidates of the speech input sentence, for accepting the word-lattice as input and for generating a set of acceptable word sequences by referring to a word-class dictionary that matches each word to corresponding word-class and to a grammar that matches each word-class sequence to corresponding sentence type, comprising:

instruction means for causing a computer to store a plurality of identifiers of word-class sequences each of which represents a sentence by unit of the word-class and word appearance number in a hash dictionary, the word-class being positioned at the word appearance number in the word-class sequence;

instruction means for causing a computer to form a node for each word in the word-lattice, the node including the word-class, an interprocessing list, lists of next nodes and unprocessed antecedent nodes in the word-lattice, the interprocessing list of the node directly linked from the start node represents the identifiers of word-class sequences for corresponding word-class and the word appearance number "1" in said hash dictionary;

instruction means for causing a computer to form a list of processing nodes representing the nodes directly from the start node;

instruction means for causing a computer to extract one node from the list of processing nodes if the list of inprocessed antecedent nodes of the one node is empty:

instruction means for causing a computer to extract each next node of the one node from the list of next nodes if the list of next nodes is not empty:

instruction means for causing a computer to retrieve the identifiers of word-class sequences from said hash dictionary by the word appearance number as lind order and the word-class of the each next node;

instruction means for causing a computer to respectively calculate a product of retrieved identifiers of the each next node and the identifiers in the interprocessing list of the one node;

instruction means for causing a computer to store the product as propagated identifiers in the interprocessing list of the each next node;

instruction means for causing a computer to delete the one node from the list unprocessed antecedent nodes of the each next node and from the list of processing nodes;

instruction means for causing a computer to add the each next node in the list of processing nodes;

instruction means for causing a computer repeat the one node-extracting step, each next node-extracting step, retrieving step, calculating step, storing step, deleting step and adding step untill the list of processing nodes is empty;

instruction means for causing a computer to extact the propagated identifiers of the end node if the list of processing nodes is empty; and instruction means for causing a computer to extract word sequences corresponding to the word-class sequences of the propagated identifiers from the word-lattice.

12. An information analysis apparatus, which connects after a speech recognizer for recognizing a user's speech input sentence and for generating a word-lattice linking a plurality of words from a start node to an end node as. recognition candidates of the speech input sentence, for accepting the word-lattice as input and for generating a set of acceptable word sequences by referring to a word-class dictionary that matches each word to corresponding word-class and to a grammar that matches each word-class sequence to corresponding sentence type, comprising:

a hierarchical hash dictionary means for storing a plurality of identifiers of partial word-class sequences each of which represents a phrase in a sentence by unit of the word-class and word appearance number, the word-class being positioned at the word appearance number in the partial word-class sequence, and for storing a plurality of identifiers of word-class sequences each of which represents the sentence by unit of the word-class, the phrase and appearance number, the word-class or the phrase being positioned at the appearance number in the sentence;

an initialization means for forming a node for each word in the word-lattice, the node including the word-class, an interprocessing list, lists of next nodes and unprocessed antecedent nodes in the word-lattice, the interprocessing list of the node directly linked from the start node represents the identifiers of partial word-class sequences for corresponding word-class and the word appearance number "1" in said hierarchical hash dictionary means, and for forming a list of processing nodes representing the nodes directly linked from the start node;

first propagation means for extracting one node from the list of processing nodes if the list of the unprocessed antecedent nodes of the one node is empty, for extracting each next node of the one node from the list of next nodes if the list of next node is not empty, for retrieving the identifiers of partial word-class sequences from said hierarchical hash dictionary means by the word appearance number as link order and the word-class of the each next node, for respectively calculating a product of retrieved identifiers of the each next node and the identifiers in the interprocessing list of the one node, for storing the product in the interprocessing list of the each next node, for deleting the one node from the list of unprocessed antecedent nodes of the each next node and from the list of processing nodes, and for adding the each next node in the list of processing nodes;

first repeat means for repeating process of said first propagation means untill the list of processing nodes is empty;

partial word sequence extraction means for extracting a partial word sequence corresponding to the partial word-class sequence in the word-lattice if the list of processing nodes is empty and the partial word-class sequence is identified in the word-lattice;

node addition means for adding a phrase node as the partial word sequence in the word-lattice, the phrase node including an interprocessing list, lists of next nodes and unprocessed antecedent nodes in the word-lattice, and for initializing the interprocessing list of each node and the list of processing nodes, the interprocessing list of the node and the phrase node directly linked from the start node represents the identifiers of word-class sequences for corresponding word-class and the appearance number "1" in said hierarchical hash dictionary means, the list of processing nodes represents the node and the phrase node directly linked from the start node;

second repeat means for repeating process of said first propagation means, first repeat means, partial word sequence extraction means and node addition means for other phrase if a plurality of phrases are defined in said hierarchical hash dictionary means and the other phrase does not include a phrase not added in the word-lattice;

second propagation means for extracting one node from the list of processing nodes if the list of the unprocessed antecedent nodes of the one node is empty, for extracting each next node of the one node from the list of next nodes if the list of next node is not empty, for retrieving the identifiers of word-class sequences from said hierarchical hash dictionary means by the appearance number as link order and the word-class of the each next node, for respectively calculating a product of retrieved identifiers. of the each next node and the identifiers in the interprocessing list of the one node, for storing the product as propagated identifiers in the interprocessing list of the each next node, for deleting the one node from the list of unprocessed antecedent nodes of the each next node and from the list of processing nodes, and for adding the each next node in the list of processing nodes;

third repeat means for repeating process of said second propagation means untill the list of processing nodes is empty; and word sequence extraction means for extracting the propagated identifiers of the end node if the list of processing nodes is empty, and for extracting word sequences corresponding to the word-class sequences of the propagated identifiers from the word-class.

13. The information analysis apparatus according to claim 12, wherein said hierarchical hash dictionary means derives from the grammar which stores a representative of the word-class sequence by unit of acceptable sentence-type.

14. The information analysis apparatus according to claim 13, wherein the partial word-class sequence is commonly extractred as the phrase from a plurality of representatives of the word-class sequences, a pattern of the partial word-class sequence is registered with an identifier, and the partial word-class sequence in the plurality of representatives is replaced by the phrase.

15. The information analysis apparatus according to claim 14, wherein the identifier of the partial word-class sequence is stored by unit of the word-class and the word appearance number as the phrase pattern in said hierarchical hash dictionary means if the word-class is positioned at the word appearance number in the phrase pattern, and the identifier of the word-class sequence is stored by unit of the word-class, the phrase and the appearance number as the sentence pattern in said hierarchical hash dictionary means if the word-class or the phrase is positioned at the appearance number in the sentence pattern.

16. The information analysis apparatus according to claim 14, further comprising a connectable word-class list in which neighboring two word-classes in the partial word-class sequence are registered as connectable word-classes in the phrase, and neighboring word-class and phrase or neighboring two word-classes in the word-class sequence are registered as connectable word-classes in the sentence.

17. The information analysis apparatus according to claim 16,
wherein the plurality of words as the recognition candidates are linked from the start point to the end point by referring to an appearance position of each word in the speech input sentence and a connectable condition between two word-classes in said connectable word-class list.

18. The information analysis apparatus according to claim 17,
wherein the phrase node as the partial word sequence is additionally linked in the word-lattice by referring to an appearance position of the partial word sequence and a connectable condition between the phrase and neighboring word-class in said connectable word-class list.

19. An information analysis method, as a post-processing of a speech recognizer for recognizing a user's speech input sentence and for generating a word-lattice linking a plurality of words from a start node to an end node as recognition candidates of the speech input sentence, for accepting the word-lattice as input and for generating a set of acceptable word sequences by referring to a word-class dictionary that matches each word to corresponding word-class and to a grammar that matches each word-class sequence to corresponding sentence type, comprising the steps of:

storing a plurality of identifiers of partial word-class sequences each of which represents a phrase in a sentence by unit of the word-class and word appearance number in a hierarchical hash dictionary, the word-class being positioned at the word appearance number in the partial word-class sequence;

storing a plurality of identifiers of word-class sequences each of which represents the sentence by unit of the word-class, the phrase and appearance unmber in the hierarchical hash dictionary, the word-class or the phrase being positioned at the appearance number in the sentence;

forming a node for each word in the word-lattice, the node including the word-class, an interprocessing list, lists of next nodes and unprocessed antecedent nodes in the word-lattice, the interprocessing list of the node directly linked from the start node represents the identifiers of partial word-class sequences for corresponding word-class and the word appearance number "1" in said hierarchical hash dictionary;

forming a list of processing nodes representing the nodes directly from the start node;

extracting one node from the list of processing nodes if the list of the unprocessed antecedent nodes of the one node is empty;

extracting each next node of the one node from the list of next nodes if the list of next nodes is not empty;

retrieving the identifiers of partial word-class sequences from said hierarchical hash dictionary by the word appearance number as link order and the word-class of the each next node;

respectively calculating a product of retrieved identifiers of the each next node and the identifiers in the interprocessing list of the one node;

storing the product in the interprocessing list of the each next node;

deleting the one node from the list of unprocessed antecedent nodes of the each next node and from the list processing nodes;

adding the each next node in the list of processing nodes;

repeating the one node-extracting step, each next node-extracting step, retrieving step, calculating step, storing step, deleting step and adding step untill the lisit of processing nodes is empty;

extracting a partial word sequence corresponding to the partial word-class sequence in the word-lattice if the list of processing nodes is empty and the partial word-class sequence is identified in the word-lattice;

adding a phrase node as the partial word sequence in the word-lattice, the phrase node including an interprocessing list, lists of next nodes and unprocessed antecedent nodes in the word-lattice;

initializing the interprocessing list of each node and the list of processing nodes, the interprocessing list of the node and the phrase node directly linked from the start node represents the identifiers of word-class sequences for corresponding word-class and the appearance number "1" in the hierarchical hash dictionary, the list of processing nodes represents the node and the phrase node directly linked from the start node;

repeating the one node-extracting step, each next node-extracting step, retrieving step, calculating step, storing step, deleting step, each next node-adding step, repeating step, partial word sequence-extracting step, phrase node-adding step and initializing step for other phrase if a plurality of phrases are defined in said hierarchical hash dictionary and the other phrase does not include a phrase not added in the word-lattice;

extracting one node from the list of processing nodes if the list of unprocessed antecedent nodes of the one node is empty;

extracting each next node of the one node from the list of next nodes if the list of next nodes is not empty;

retrieving the identifiers of word-class sequences from said hierarchical hash dictionary by the appearance number as link order and the word-class of the each next node;

respectively calculating a product of retrieved identifiers of the each next node and the identifiers in the interprocessing list of the one node;

storing the product as propagated identifiers in the interprocessing list of the each next node;

deleting the one node from the list of unprocessed antecedent nodes of the each next node and from the list of processing nodes;

adding the each next node in the list of processing nodes;

repeating the one node-extracting step, each next node-extracting step, retrieving step, calculating step, storing step, deleting step and adding step untill the list of processing nodes is empty;

extracting the propagated identifiers of the end node if the list of processing nodes is empty; and extracting word sequences corresponding to the word-class sequences of the propagated identifiers from the word-lattice.

20. A computer readable memory, as a post-processing of a speech recognizer for recognizing a user's speech input sentence and for generating a word-lattice linking a plurality of words from a start node to an end node as recognition candidates of the speech input sentence, for accepting the word-lattice as input and for generating a set of acceptable word sequences by referring to a word-class dictionary that matches each word to corresponding word-class and to a grammar that matches each word-class sequence to corresponding sentence type, comprising:

instruction means for causing a computer to store a plurality of identifiers of partial word-class sequences each of which represents a phrase in a sentence by unit of the word-class and word appearance number in a hierarchical hash dictionary, the word-class being positioned at the word appearance number in the partical word-class sequence;

instruction means for causing a computer to store a pluralitiy of identifiers of word-class sequences each of which represents the sentence by unit of the word-class, the phrase and appearance number in the hierarchical hash dictionary, the word-class or the phrase being positioned at the appearance number in the sentence;

instruction means for causing a computer to form a node for each word in the word-lattice, the node including the word-class, an interprocessing list, lists of next nodes and unprocessed antecedent nodes in the word-lattice, the interprocessing list of the node directly linked from the start node represents the identifiers of partial word-class sezwences for corresponding word-class and the word appearance number "1" in said hierarchical hash dictionary;

instruction means for causing a computer to form a list of processing nodes representing the nodes directly from the start node;

instruction means for causing a computer to extract one node from the list of processing nodes of the list of the unprocessed antecedent nodes of the one node is empty;

instruction means for causing a computer to extract each next node of the one node from the list of next nodes if the list of next nodes is not empty;

instruction means for causing a computer to retrieve the identifiers of partial word-class sequences from said hierarchical hash dictionary by the word appearance number as link order and the word-class of the each next node;

instruction means for causing a computer to respectively calculate a product of retrieved identifiers of the each next node and the identifiers in the interprocessing list of the one node;

instruction means for causing a computer to store the product in the interprocessing list of the each next node;

instruction means for causing a computer to delete the one node from the list of unprocessed antecedent nodes of the each next node and from the list of processing nodes;

instruction means for causing a computer to add the each next node in the list of processing nodes;

instruction means for causing a computer to repeat the one node-extracting step, each next node-extracting step, retrieving step, calculating step, storing step, deleting step and adding step untill the list of processing nodes is empty;

instruction means for causing a computer to extract a partial word sequence corresponding to the partial word-class sequence in the word-lattice if the list of processing nodes is empty and the partial word-class sequence is identified in the word-lattice;

instruction means for causing a computer to add a phrase node as the partial word sequence in the word-lattice, the phrase node including an interprocessing list, lists of next nodes and unprocessed antecedent nodes in the word-lattice;

instruction means for causing a computer to initialize the interprocessing list of each node and the list of processing nodes, the interprocessing list of the node and the phrase node directly linked from the start node represents the identifiers of word-class sequences for corresponding word-class and the appearance number "1" in the hierarchical hash dictionary, the list of processing nodes represents the node and the phrase node directly linked from the start node;

instruction means for causing a computer to repeat the one node-extracting step, each next node-extracting step, retrieving step, calculating step, storing step, deleting step, each next node-adding step, repeating step, partial word sequence-extracting step, phrase node-adding step and initializing step for other phrase if a plurality of phrases are defined in said hierarchical hash dictionary and the other phrase does not include a phrase not added in the word-lattice;

instruction means for causing a computer to extract one node from the list of processing nodes if the list of unprocessed antecedent nodes of the one node is empty;

instruction means for causing a computer to extract each next node of the one node from the list of next nodes if the list of next nodes is not empty;

instruction means for causing a computer to retrieve the identifiers of word-class sequences from said hierarchical hash dictionary by the appearance number as link order and the word-class of the each next node;

instruction means for causing a computer to respectively calculate a product of retrieved identifiers of the each next node and the identifiers in the interprocessing list of the one node;

instruction means for causing a computer to store the product as propagated identifiers in the interprocessing list of the each next node;

instruction means for causing a computer to delete the one node from the list of unprocessed antecedent nodes of the each next node and from the list of processing nodes;

instruction means for causing a computer add the each next node in the list of processing node;

instruction means for causing a computer to repeat the one node-extracting step, each next node-extracting step, retrieving step, calculating step, storing step, deleting step and adding step untill the list of processing nodes is empty;

instruction means for causing a computer to extract the propagated identifiers of the end node if the list of processing nodes is empty; and instruction means for causing a computer to extract word sequences corresponding to the word-class sequences of the propagated identifiers from the word-lattice.

* * * * *

UNITED STATES PATENT AND TRADEMARK OFFICE
CERTIFICATE OF CORRECTION

PATENT NO. : 6,169,972 B1
DATED : January 2, 2001
INVENTOR(S) : Yasuyuki Kono et al.

It is certified that error appears in the above-identified patent and that said Letters Patent is hereby corrected as shown below:

Title page,
Item [54], in the Title, "INFORMATION ANALYSIS AND METHOD" should read -- INFORMATION ANALYSIS APPARATUS AND METHOD FOR RECOGNIZING A USER'S SPEECH INPUT SENTENCE AS A WORD-LATTICE AND FOR IDENTIFYING ACCEPTABLE WORD SEQUENCES THEREFROM --.
Item [57], ABSTRACT, line 20, "untill" should read -- until --.

Column 20, claim 1,
Line 28, "untill" should read -- until --.

Column 21, claim 10,
Line 64, "untill" should read -- until --.

Column 22, claim 11,
Line 34, "empty:" should read -- empty; --.
Line 37, "empty:" should read -- empty; --.
Line 40, "lind order" should read -- link order --.
Line 55, "computer repeat" should read -- computer to repeat --.
Line 58, "untill" should read -- until --.
Line 60, "extact" should read -- extract --.

Column 23, claim 12,
Line 2, "as." should read -- as --.
Line 35, "list of next node" should read -- list of next nodes --.
Line 48, "untill" should read -- until --.

Column 24, claim 12,
Line 11, "list of next node" should read -- list of next nodes --.
Line 16, "identifiers." should read -- identifiers --.
Line 25, "untill" should read -- until --.

Column 24, claim 14,
Line 41, "extractred" should read -- extracted --.

UNITED STATES PATENT AND TRADEMARK OFFICE
CERTIFICATE OF CORRECTION

PATENT NO. : 6,169,972 B1
DATED : January 2, 2001
INVENTOR(S) : Yasuyuki Kono et al.

It is certified that error appears in the above-identified patent and that said Letters Patent is hereby corrected as shown below:

Column 25, claim 19,
Line 32, "pluratity" should read -- plurality --.
Line 34, "unmber" should read -- number --.

Column 26, claim 19,
Line 3, "untill the lisit" should read -- until the list --.
Line 51, "untill" should read -- until --.

Column 27, claim 20,
Line 6, "partical" should read -- partial --.
Line 20, "sezwences" should read -- sequences --.
Line 56, "untill" should read -- until --.

Column 28, claim 20,
Line 48, "computer add" should read -- computer to add --.
Line 53, "untill" should read -- until --.

Signed and Sealed this

Ninth Day of April, 2002

Attest:

Attesting Officer

JAMES E. ROGAN
*Director of the United States Patent and Trademark Office*